(12) United States Patent
Dechinamoorthy et al.

(10) Patent No.: US 12,541,111 B1
(45) Date of Patent: Feb. 3, 2026

(54) IPD AND DIOPTER ADJUSTMENT FOR DISPLAY DEVICES

(71) Applicant: QUALCOMM Incorporated, San Diego, CA (US)

(72) Inventors: Thirukumaran Dechinamoorthy, Hyderabad (IN); Harsha Vardhan Kandrela, Visakhapatnam (IN); Ashwini Ajay Deshmukh, Pune (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/318,677

(22) Filed: May 16, 2023

(51) Int. Cl.
G02B 27/01 (2006.01)

(52) U.S. Cl.
CPC ..... *G02B 27/0176* (2013.01); *G02B 27/0172* (2013.01)

(58) Field of Classification Search
CPC .................. G02B 27/0176; G02B 27/0172
See application file for complete search history.

(56) References Cited

U.S. PATENT DOCUMENTS

| 5,572,361 | A | 11/1996 | Kamiya et al. |
| 2006/0072206 | A1* | 4/2006 | Tsuyuki ............. G02B 27/0172 348/E13.041 |
| 2008/0284843 | A1* | 11/2008 | Jo ....................... H04N 13/122 348/51 |
| 2012/0092514 | A1* | 4/2012 | Vandame .............. G03B 13/06 348/222.1 |
| 2018/0213212 | A1* | 7/2018 | Liu ....................... H04N 13/344 |
| 2019/0302394 | A1* | 10/2019 | Zhou ...................... G02B 7/023 |
| 2019/0361249 | A1* | 11/2019 | Lanman .................. G06F 1/163 |
| 2020/0310137 | A1 | 10/2020 | Lan |
| 2021/0199975 | A1* | 7/2021 | Matsumoto ........ G02B 27/0172 |
| 2022/0252883 | A1* | 8/2022 | Tsai ........................ G06F 3/013 |

(Continued)

FOREIGN PATENT DOCUMENTS

| CN | 206848558 U | 1/2018 |
| CN | 108008537 A | 5/2018 |

(Continued)

OTHER PUBLICATIONS

Hu, (Translation of 206848558), Jan. 5, 2018 (Year: 2018).*

(Continued)

*Primary Examiner* — Dmitriy Bolotin
(74) *Attorney, Agent, or Firm* — QUALCOMM Incorporated

(57) ABSTRACT

Aspects presented herein relate to methods, devices, and apparatuses for device adjustment. The apparatus may identify: a left focal length of a left eye display of a display device, a right focal length of a right eye display of the display device, and/or a first eye distance of the display device. The apparatus may also detect whether: the left focal length is equivalent to an inverse of a diopter value of a left eye of a user of the display device, the right focal length is equivalent to an inverse of a diopter value of a right eye of the user, and/or the first eye distance is equivalent to a second eye distance of the user. The apparatus may also adjust: the left focal length of the left eye display, the right focal length of the right eye display, and/or the first eye distance of the display device.

18 Claims, 13 Drawing Sheets

(56) References Cited

U.S. PATENT DOCUMENTS

2022/0377312 A1\* 11/2022 Samples .............. H04N 13/344
2023/0066962 A1    3/2023 Oikawa et al.

FOREIGN PATENT DOCUMENTS

| CN | 213987032 U | 8/2021 |
| EP | 3072009 A1 | 9/2016 |

OTHER PUBLICATIONS

International Search Report and Written Opinion—PCT/US2024/024793—ISA/EPO—Aug. 1, 2024.
Rash C.E., et al., "Helmet-Mounted Displays: Sensation, Perception and Cognition Issies", US Army Aeromedical Research Laboratory (USAARL), Jan. 1, 2009, pp. 1-970, p. 289-p. 290.

\* cited by examiner

IPD AND DIOPTER ADJUSTMENT FOR DISPLAY DEVICES

TECHNICAL FIELD

The present disclosure relates generally to processing systems and, more particularly, to one or more techniques for interpupillary distance (IPD) and diopter adjustment for display devices.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be any apparatus that may perform device adjustment. The apparatus may identify at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display. Additionally, the apparatus may detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user. The apparatus may also adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user.

In an aspect of the disclosure, a device or apparatus is provided. The device may include a left adjustment knob and a right adjustment knob; a left bevel gear coupled to the left adjustment knob and a right bevel gear coupled to the right adjustment knob; where the left bevel gear and the right bevel gear are configured to adjust at least one of (1) a left focal length of a left eye display of the device based on the left focal length being inequivalent to an inverse of a diopter value of a left eye of a user of the device, (2) a right focal length of a right eye display based on the right focal length being inequivalent to an inverse of a diopter value of a right eye of the user, or (3) a first eye distance of the device based on the first eye distance being inequivalent to a second eye distance of the user, where the first eye distance of the device is a length between the left eye display and the right eye display of the device, where the second eye distance of the user is a length between the left eye of the user and the right eye of the user, where the left focal length is a distance between a center of the left eye display and a focus of a lens in the left eye display, where the right focal length is a distance between a center of the right eye display and a focus of a lens in the right eye display, where the diopter value of the left eye of the user is associated with a visual clarity of the left eye of the user, where the diopter value of the right eye of the user is associated with a visual clarity of the right eye of the use. The device may further include: at least one of a set of support brackets, a set of e-rings, or a set of screws coupled to at least one of the left adjustment knob or the right adjustment knob, where at least one of the set of support brackets, the set of screws, or the set of e-rings is configured to hold the left adjustment knob in place with respect to the left bevel gear, and where at least one of the set of support brackets, the set of screws, or the set of e-rings is configured to hold the right adjustment knob in place with respect to the right bevel gear.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
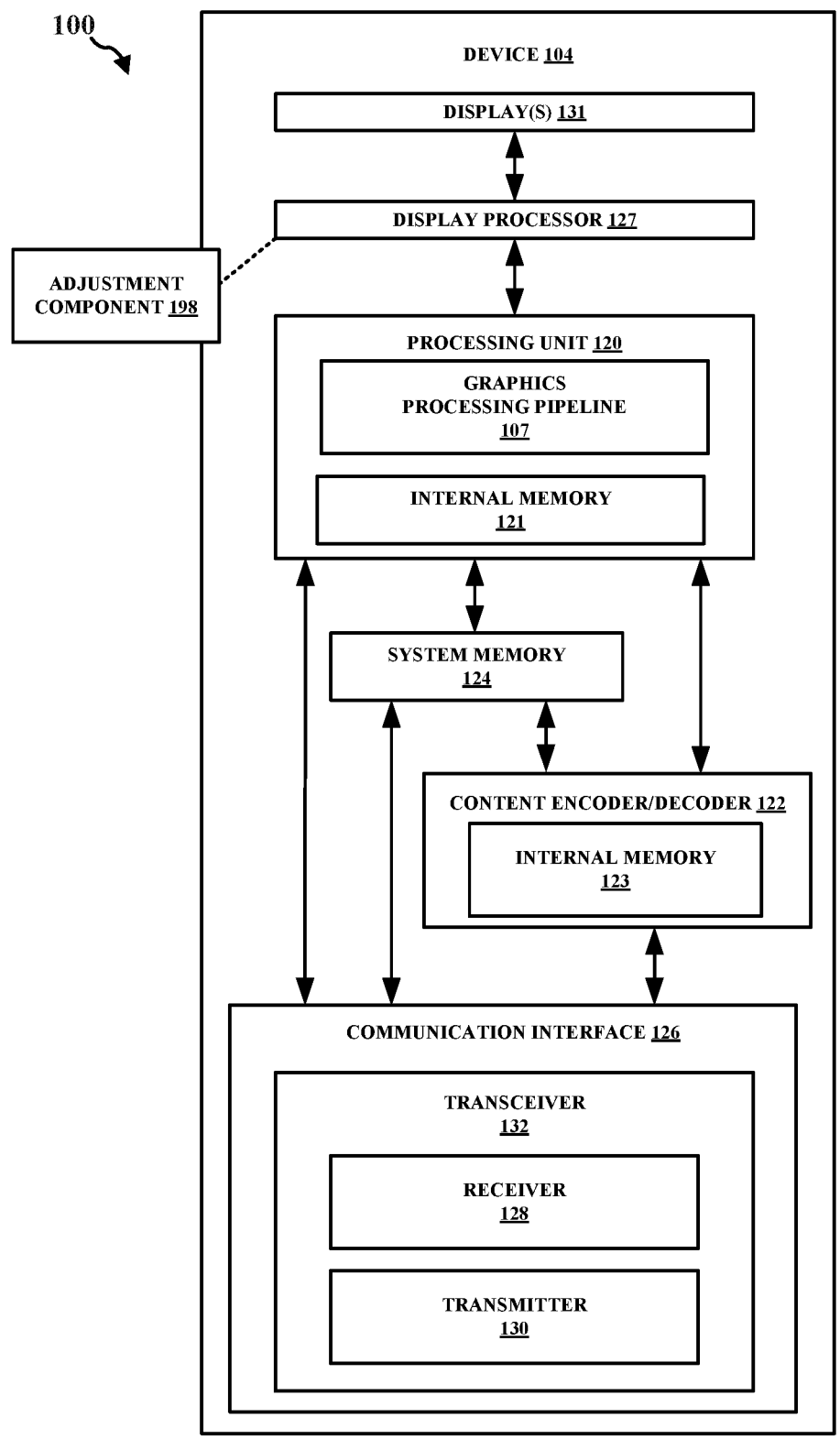
FIG. 1 is a block diagram that illustrates an example content generation system.

Interpupillary distance (IPD) adjustment and diopter adjustment are some of the key features for users in display devices (e.g., extended reality (XR) devices and augmented reality (AR) devices), as these features allow the display device to be customizable to a specific user. However, interpupillary distance (IPD) adjustment and diopter adjustment is a challenging feature on headsets and head-mounted displays (HMDs). For instance, the existing mechanisms are complex from both a design and an assembly perspective. The manufacturing processes may also need special molding tools and more precision as well, as the components may be small which increases the overall cost for these devices. Further, some of the present IPD adjustment mechanisms and diopter adjustment mechanisms are manual, including complex mechanisms that have more moving parts, which can add more weight and also occupy an increased amount of space. Moreover, in some aspects, multiple different mechanisms may be needed: one to adjust the interpupillary distance of the device and the other one to adjust the diopter of the device. Aspects of the present disclosure may utilize a single device or mechanism in order to adjust the interpupillary distance and the diopter of a device. That is, aspects presented herein may utilize a reduced amount of components and space in order to adjust the interpupillary distance and the diopter of a device. For instance, aspects presented herein may utilize a single mechanism setup to achieve both IPD adjustment and diopter adjustment using fewer moving parts.

Aspects presented herein may include a number of benefits or advantages. For instance, aspects presented herein may utilize a bevel mechanism for both IPD and diopter adjustment. In turn, this may reduce the amount of cost by reducing the manufacturing cost. Also, aspects presented herein may utilize a reduced number of components for the IPD and diopter adjustment (e.g., 6 components excluding hardware). Aspects presented herein may also utilize an individual movement of each lens along with a display for better adjustment of the IPD and diopter. Further, aspects presented herein may utilize two major components, which may make the device simple and include a robust setup. Additionally, aspects presented herein may utilize a reduced amount of space in the device, utilize a reduced amount of effort in order to operate the device, and/or utilize a reduced amount of effort in order to assemble the device.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include an adjustment component 198 configured to identify at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display. The adjustment component 198 may also be configured to detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user. The adjustment component 198 may also be configured to adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user.

Although the following description may be focused on device adjustment or display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
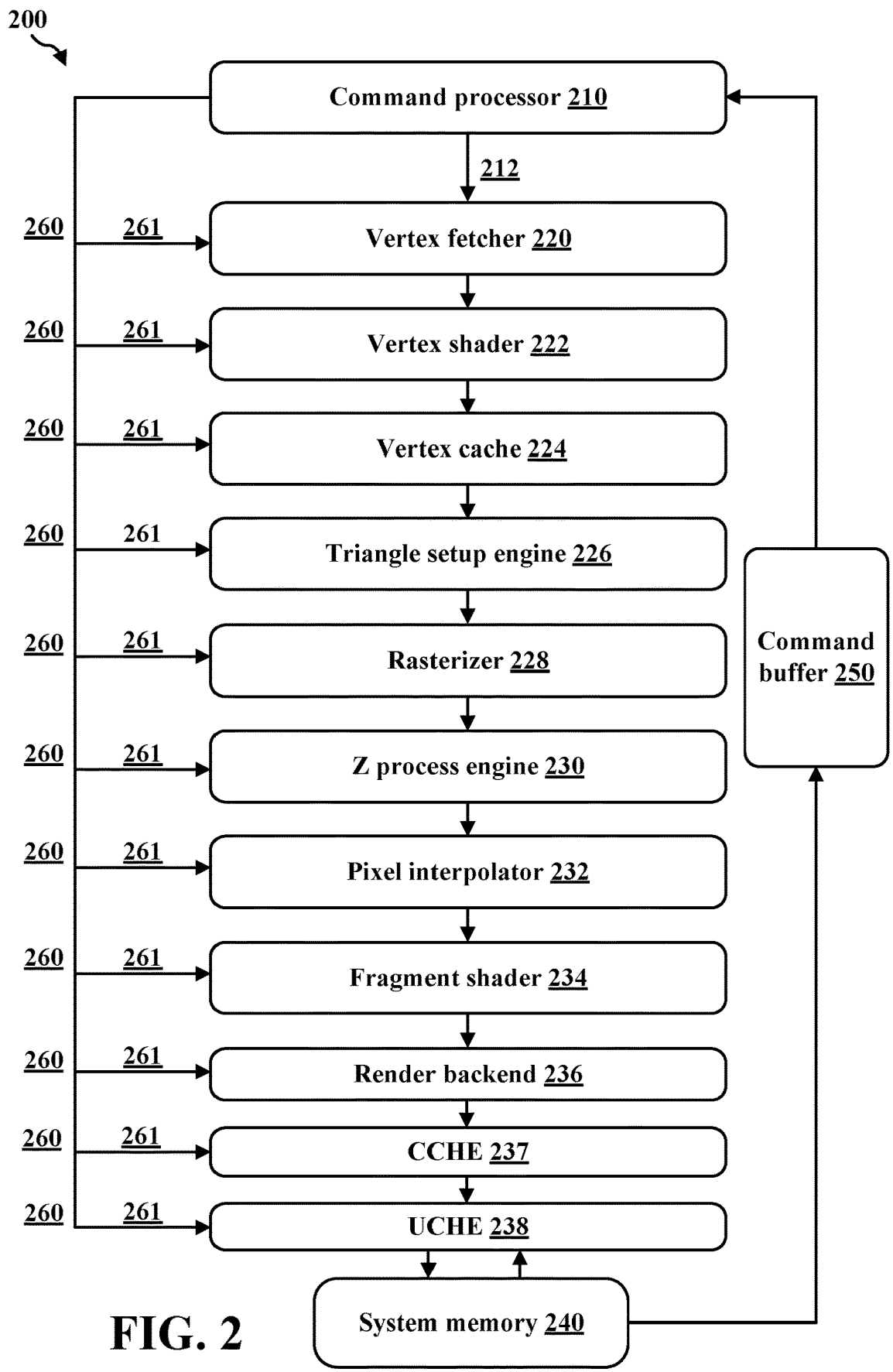
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR)

memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Figure 3:
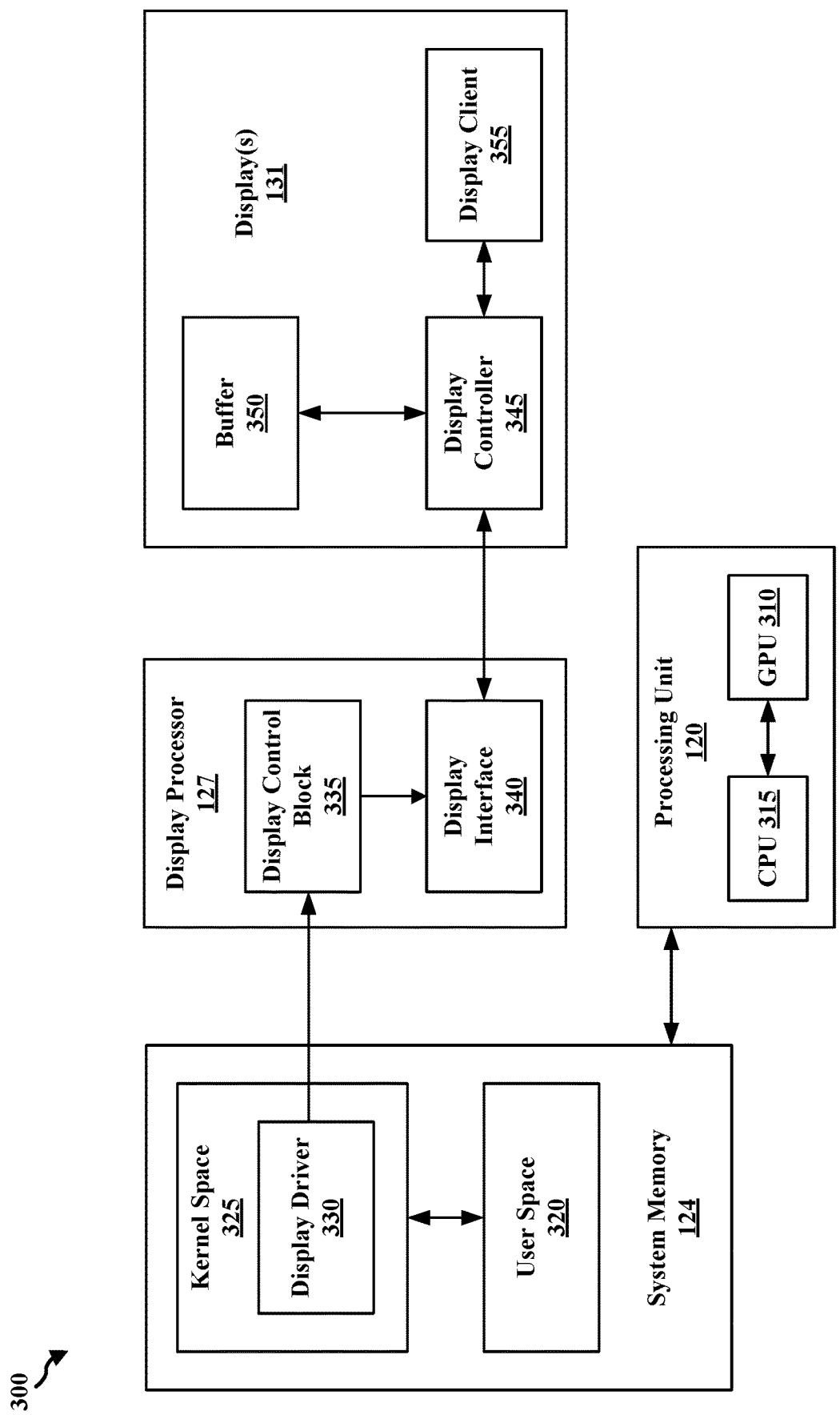
FIG. 3 is a diagram illustrating example processing components.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
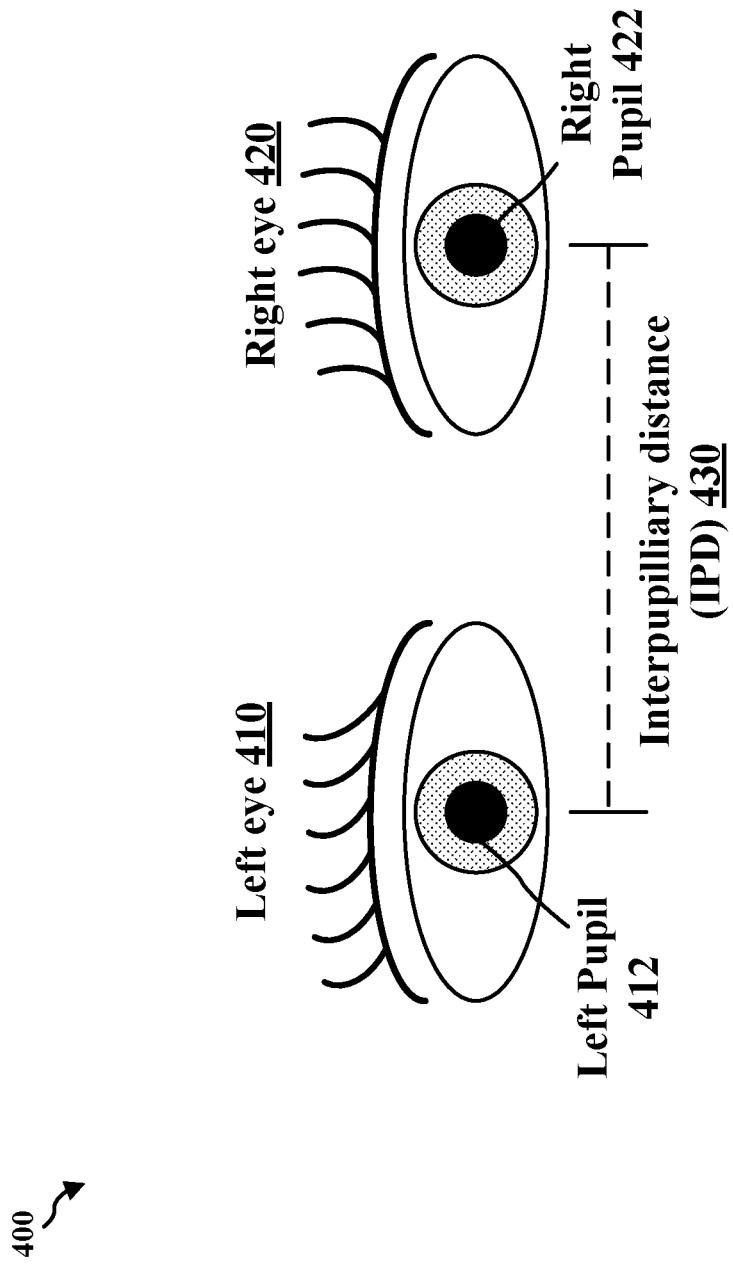
FIG. 4 is a diagram illustrating an example distance between eyes.

FIG. 4 is a diagram 400 illustrating an example distance between eyes. More specifically, FIG. 4 depicts an interpupillary distance (IPD) between a left eye 410 and a right eye 420. As shown in FIG. 4, diagram 400 includes left eye 410, left pupil 412, right eye 420, right pupil 422, and interpupillary distance 430. As illustrated in FIG. 4, an interpupillary distance (IPD) is the distance between the center of the pupils between two eyes. For instance, interpupillary distance 430 is equal to the distance between the center of left pupil 412 and the center of right pupil 422.

As depicted in FIG. 4, interpupillary distance (IPD) is the distance between the center of the pupils of eyes. For instance, interpupillary distance can determine the degree of retinal image disparity in fellow eyes which are combined in the brain to produce stereo perception. Interpupillary distance may be important for the design of certain viewing systems (e.g., binocular viewing systems), where both eye pupils need to be positioned within the exit pupils of the viewing system. For example, these types of viewing systems may include binocular microscopes, night vision devices or goggles, and head-mounted displays (HMDs). Interpupillary distance data may be used in the design of such systems in order to specify the range of lateral adjustment of the exit optics or eyepieces. The interpupillary distance may also be used to describe the distance between the exit pupils or optical axes of a binocular optical system. In one aspect, a distinction with IPD may be the importance of anthropometric databases and the design of binocular viewing devices with an IPD adjustment that will fit certain types of users.

Instruments such as optical instruments or HMDs may be used by a number of different people, so the distance between the eye pieces may be adjustable in order to account for the interpupillary distance. Adjusting the distance between the displays as per the individual's interpupillary distance is widely adopted in immersive visualization systems to improve user experience. In some applications, when the interpupillary distance is not correctly set, it can lead to an uncomfortable viewing experience and eye strain. For instance, an incorrect interpupillary distance may induce eye strain, fatigue, headaches and blurry vision. As the real world is seen from the perspective of an individual's interpupillary distance, the correct alignment in a headset is important for matching the ingrained sense of three-dimensional (3D) depth and scale. For example, if the display is not adjusted as per a human IPD, a user may start to feel eyestrain and eventually it becomes hard to see the image correctly (e.g., resulting in double vision). Additionally, if the IPD of a headset is incorrectly set, the scale of the virtual world may appear to be slightly incorrect. Therefore, the IPD may need to be adjusted carefully in order to provide sufficient stereo effect while also maintaining user comfort.

Figure 5:
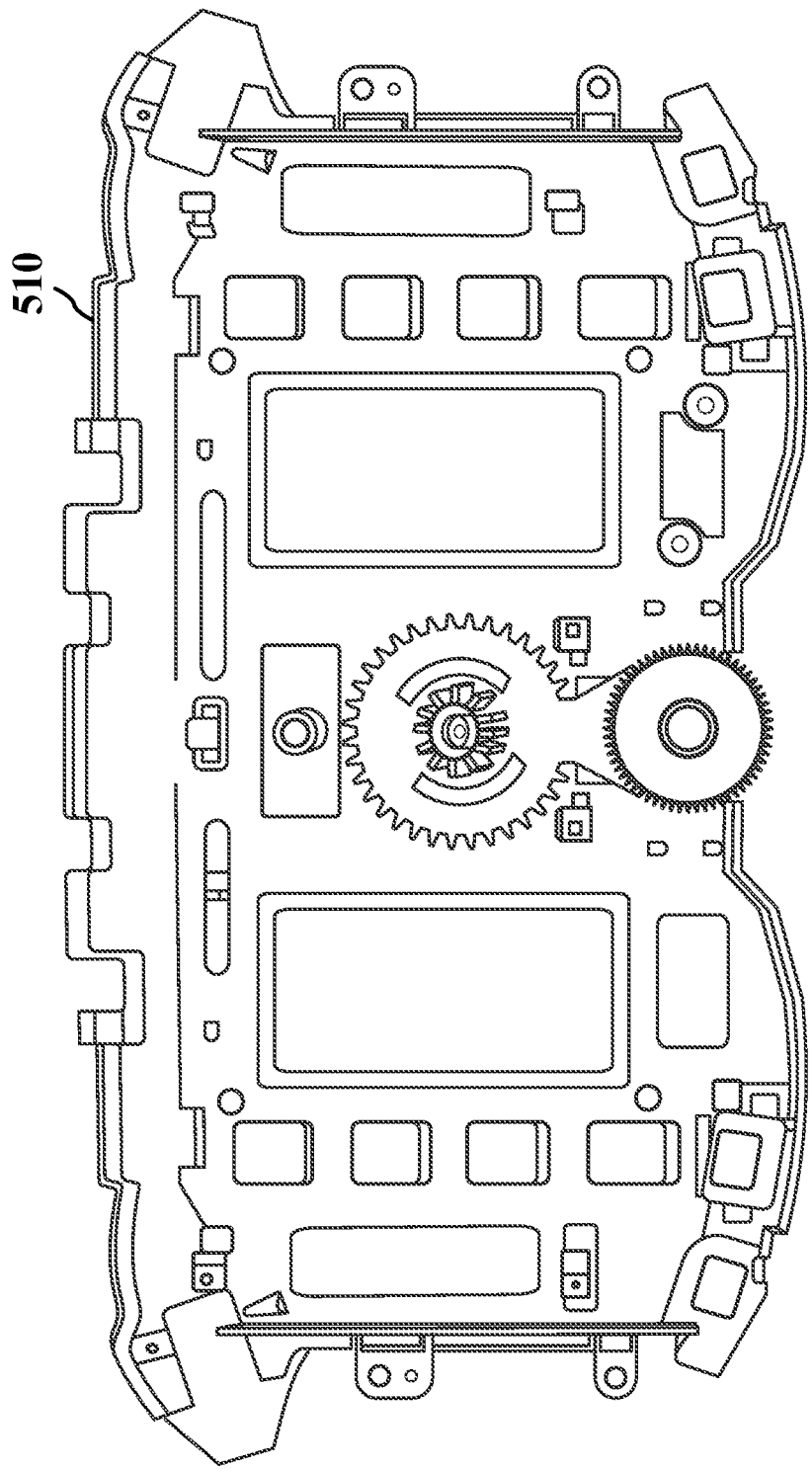
FIG. 5 is a diagram illustrating an example interpupillary distance (IPD) adjustment device.

FIG. 5 is a diagram 500 illustrating an example interpupillary distance adjustment device. More specifically, FIG. 5 depicts an interpupillary distance (IPD) adjustment device that utilizes a rack and pinion mechanism. As shown in FIG. 5, diagram 500 includes an IPD adjustment device 510. As depicted in FIG. 5, the design and manufacture of IPD adjustment device 510 (e.g., a rack and pinon mechanism) may need a large number of components, which will be costly. Further, the design and manufacture of devices such as IPD adjustment device 510 may need a complex assembly process. Additionally, the IPD adjustment device 510 (e.g., a rack and pinon mechanism) may be utilized on head-mounted displays (HMDs) in order to perform interpupillary distance adjustment. A pinion may be rod including a small gear in a pair of meshing gears. However, the design and manufacture of such devices (e.g., IPD adjustment device 510) may be costly, along with increasing the weight of the overall assembly. Also, the design and manufacture of such devices may utilize a complex assembly.

A diopter is a unit of refractive power that is equal to the reciprocal of the focal length (in meters) of a given lens. For instance, a diopter is a unit of measurement with dimension of reciprocal length, equivalent to one reciprocal meter (e.g., 1 diopter=1 $m^1$). Diopter is normally used to express the optical power of a lens or curved mirror, which is a physical quantity equal to the reciprocal of the focal length, expressed in meters. For example, a 3-dioptre lens brings parallel rays of light to focus at ⅓ of a meter. If a surface does not cause light to converge or diverge, (e.g., a flat window), the surface has an optical power of zero diopters. Diopters are also sometimes used for other reciprocals of distance, particularly radii of curvature and the convergence of optical beams.

Diopter adjustment is a feature that is used is certain optical devices (e.g., cameras, binoculars, headsets, HMDs, etc.) that adjusts optics to compensate for the differences in a user's vision. Diopter adjustment may enable near-sighted or far-sighted users to adjust the eyepiece diopter in order to suit their vision. Individually different adjusters for each eye in a headset or HMD may help users further fine-tune the optics to make images clear. Similar to IPD adjustment, diopter adjustment may allow the user to customize the lens so that the user can see a clear, focused image through the lens. For instance, diopter adjustment may allow the user to see a clear, focused image without using eyeglasses or contact lenses to correct their vision.

Figure 6:
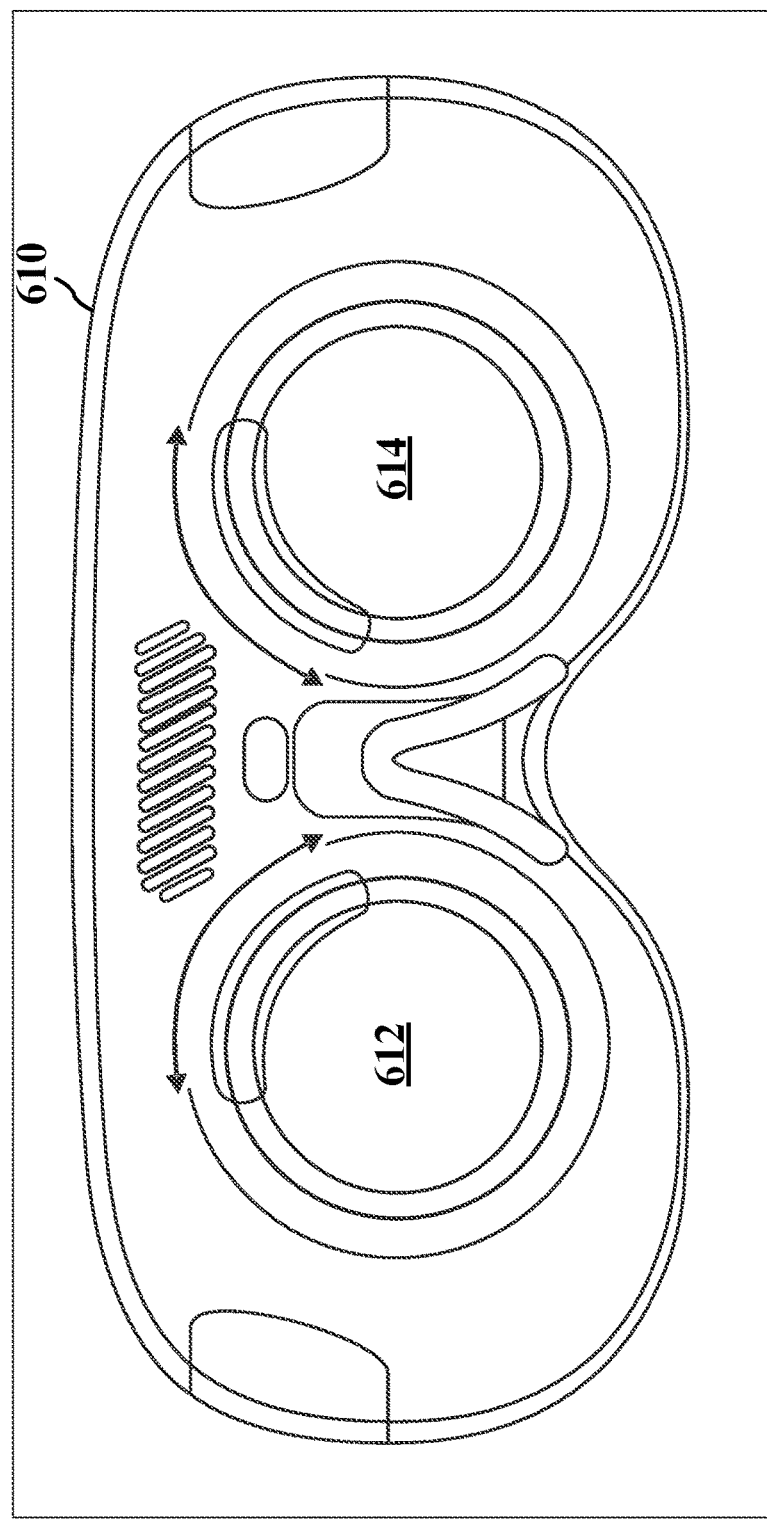
FIG. 6 is a diagram illustrating an example diopter adjustment device.

FIG. 6 is a diagram 600 illustrating an example diopter adjustment device. More specifically, FIG. 6 depicts a diopter adjustment device that rotates the lenses of the device manually. As shown in FIG. 6, diagram 600 includes a diopter adjustment device 610 (e.g., a headset or HMD)

including left lens 612 and right lens 614. As depicted in FIG. 6, the diopter adjustment device 610 may need a user to remove the headset or HMD and adjust the left lens 612 and right lens 614 manually. For instance, the user may not be able to adjust the lens while using the diopter adjustment device 610, which makes it difficult to calibrate the lens while using the device. Accordingly, the left lens 612 and right lens 614 may be adjusted if the user removes the diopter adjustment device 610.

Figure 7:
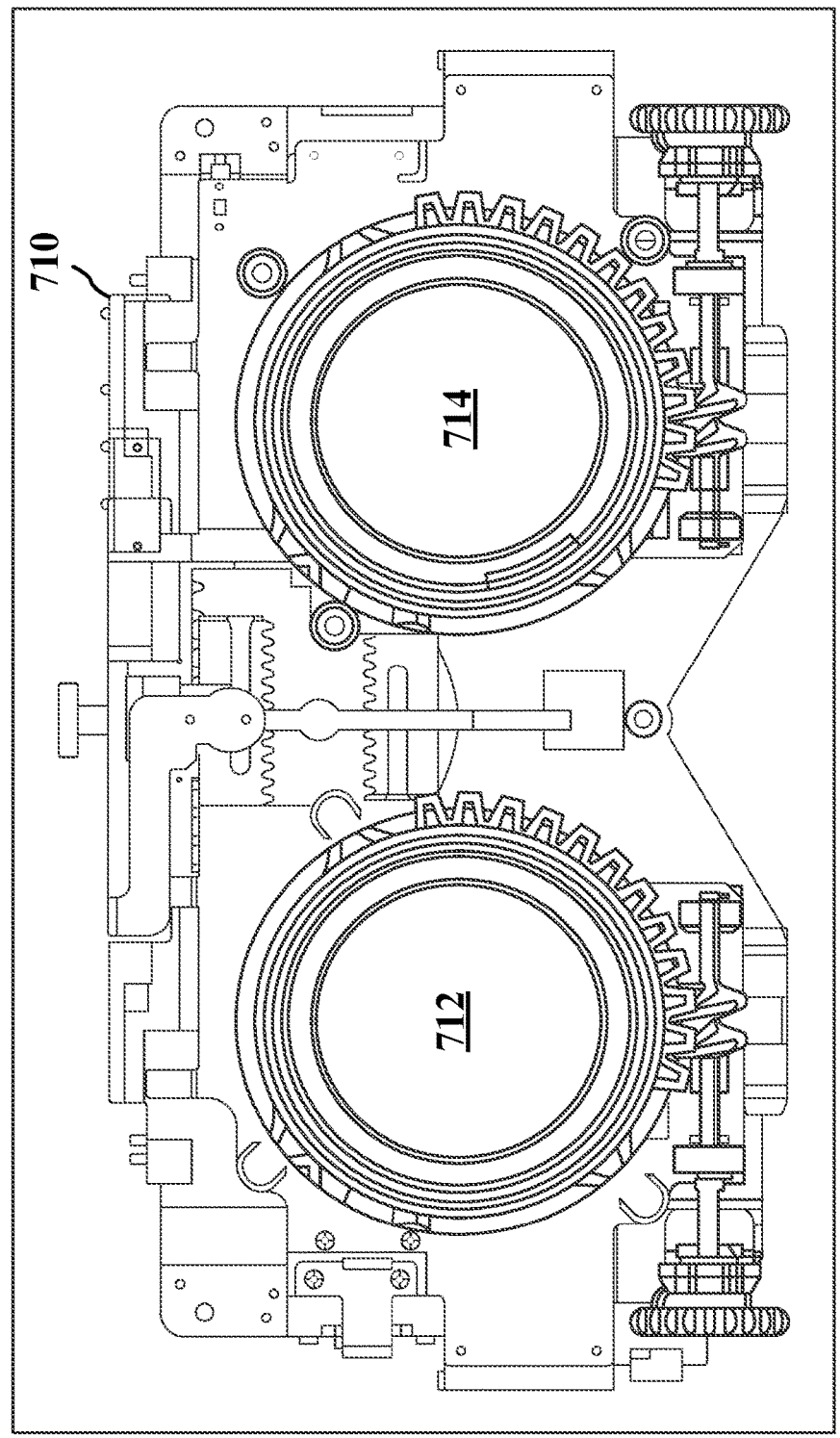
FIG. 7 is a diagram illustrating an example diopter adjustment device.

FIG. 7 is a diagram 700 illustrating another example diopter adjustment device. More specifically, FIG. 7 depicts a diopter adjustment device that uses a certain type of setup (e.g., a worm gear setup) on a head-mounted display. As shown in FIG. 7, diagram 700 includes a diopter adjustment device 710 (e.g., a headset or HMD) including left lens 712 and right lens 714. That is, the left lens 712 and right lens 714 of diopter adjustment device 710 may be adjusted. As depicted in FIG. 7, the diopter adjustment device 710 may need a high cost for design and manufacturing. Further, the diopter adjustment device 710 in FIG. 7 may utilize complex assembly and may need a high number of components.

IPD adjustment and diopter adjustment are some of the key features for users in display devices (e.g., extended reality (XR) devices and augmented reality (AR) devices), as these features allow the display device to be customizable to a specific user. However, as depicted in FIGS. 5-7, interpupillary distance (IPD) adjustment and diopter adjustment is a challenging feature on headsets and HMDs. For instance, the existing mechanisms are complex from both a design and an assembly perspective. The manufacturing processes may also need special molding tools and more precision as well, as the components may be small which increases the overall cost for these devices. Further, some of the present IPD adjustment mechanisms and diopter adjustment mechanisms are manual, including complex mechanisms that have more moving parts, which can add more weight and also occupy an increased amount of space. Moreover, in some aspects, multiple different mechanisms may be needed: one to adjust the interpupillary distance of the device and the other one to adjust the diopter of the device. Based on the above, it may be beneficial to utilize a single device or mechanism in order to adjust the interpupillary distance and the diopter of a device. For instance, it may be beneficial to utilize a reduced amount of components and space in order to adjust the interpupillary distance and the diopter of a device.

Aspects of the present disclosure may utilize a single device or mechanism in order to adjust the interpupillary distance and the diopter of a device. That is, aspects presented herein may utilize a reduced amount of components and space in order to adjust the interpupillary distance and the diopter of a device. For instance, aspects presented herein may utilize a single mechanism setup to achieve both IPD adjustment and diopter adjustment using fewer moving parts. Therefore, the space occupied at the device may also be reduced compared to existing mechanisms. Also, aspects presented herein may use a bevel gear mechanism for diopter adjustment, as well as a same pinion to adjust the interpupillary distance. As such, aspects presented herein may focus on adjusting the IPD and diopter using a single bevel gear mechanism for each eye display of the device. Indeed, aspects presented herein may make the IPD adjustment and diopter adjustment process more simple to operate, less expensive to produce, and also occupy less space at the device.

Aspects presented herein may utilize certain types of components in order to utilize a single mechanism setup to achieve both IPD adjustment and diopter adjustment. For example, aspects presented herein may utilize adjustment knobs and bevel gears in order to achieve both IPD adjustment and diopter adjustment at the same device. Bevel gears may be two gears including shafts, where the axes of the two shafts intersect and faces of the gears (e.g., tooth-bearing faces) include a certain shape (e.g., a conical shape). Bevel gears may be mounted on shafts that are a certain number of degrees (e.g., 90 degrees) apart. These shafts that are attached to bevel gears may also be referred to as adjustment knobs, which may also include pinions. The pitch surface of bevel gears may be a certain shape (e.g., a cone or a pitch cone). Bevel gears may transfer energy from linear to vertical power, which may make be useful in machines.

In some aspects of the present disclosure, the adjustment knob or pinion that is attached to the bevel may be mounted on a bracket holding the lens and the display. The lens may be attached to the bevel gear, which is meshed with the adjustment knob or pinion. The longitudinal movement of each adjustment knob or pinion towards the left and right direction may move each display and lens towards the left and right directions, respectively. Therefore, this left and right movement may achieve the necessary IPD distance for each individual user. Additionally, the diopter adjustment may be achieved by the rotation of the adjustment knob or pinion, which in turn rotates the bevel gear (e.g., crown bevel gear) that is attached to the lens. Accordingly, this rotation of the adjustment knob or pinion (i.e., a rod including a small gear in a pair of meshing gears) may achieve the rotational movement of the lens to obtain the utilized diopter value individually for each lens in the display device. As such, aspects presented herein may implement a bevel mechanism for the adjustment of both IPD and diopter together. Aspects presented herein may utilize a single mechanism to achieve both IPD and diopter adjustment using fewer moving parts. In some instances, the bevel gear may be meshed with a pinion for each lens, which may be used to adjust the longitudinal movement of each display and lens and adjust the IPD distance. The diopter adjustment may be achieved by the rotation of the pinion which in turn rotates the bevel gear that is attached to the lens. Rotational movement of the lens may result in obtaining the diopter value individually for each of the lenses.

Figure 8:
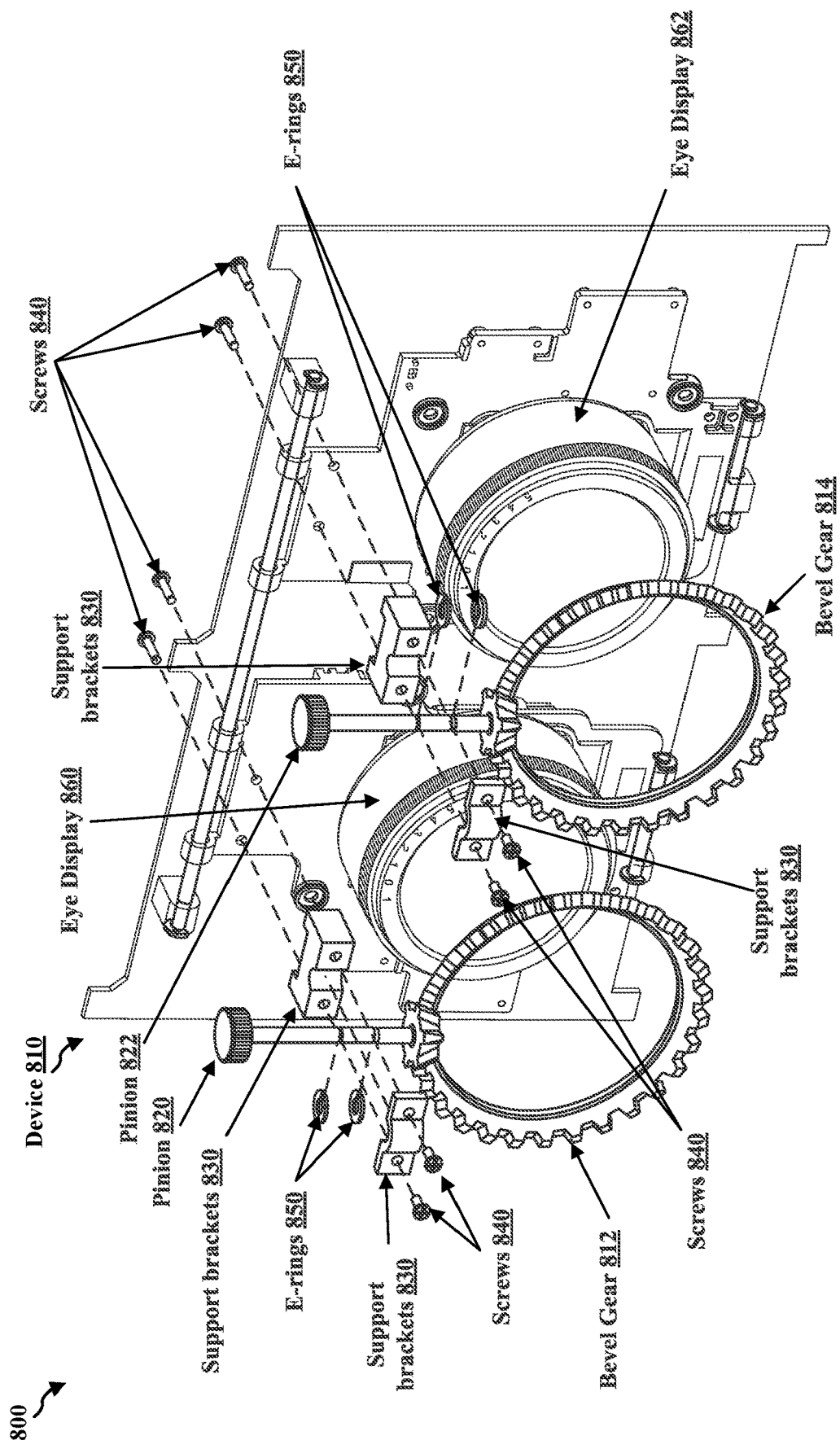
FIG. 8 is a diagram illustrating an example device for IPD adjustment and diopter adjustment.

FIG. 8 is a diagram 800 (i.e., an exploded view diagram) illustrating an example device for adjusting a display at a headset or HMD. More specifically, FIG. 8 depicts an example display device for IPD adjustment and diopter adjustment. As shown in FIG. 8, diagram 800 includes device 810 for IPD adjustment and diopter adjustment including bevel gear 812 (e.g., left bevel gear), bevel gear 814 (e.g., right bevel gear), pinion 820 (e.g., left adjustment knob), pinion 822 (e.g., right adjustment knob), support brackets 830 (e.g., a set of support brackets), screws 840 (e.g., a set of screws), e-rings 850 (e.g., a set of e-rings, which are a type of retaining ring), eye display 860 (e.g., a left eye display), and eye display 862 (e.g., a right eye display). As depicted in FIG. 8, diagram 800 shows that pinion 820 (e.g., left adjustment knob) may be coupled to bevel gear 812 (e.g., left bevel gear) and pinion 822 (e.g., right adjustment knob) may be coupled to bevel gear 814 (e.g., right bevel gear). Further, pinion 820 (e.g., left adjustment knob) may be coupled to support brackets 830, screws 840, and e-rings 850. For instance, support brackets 830, screws 840, and e-rings 850 may be configured to hold the pinion 820 (e.g., left adjustment knob) in place with respect to the bevel gear 812 (e.g., left bevel gear). Also, pinion 822 (e.g., right adjustment knob) may be coupled to support brackets 830, screws 840, and e-rings 850. For example, support brackets 830, screws 840, and e-rings 850 may be configured to hold the pinion 822 (e.g., right adjustment knob) in place with respect to the bevel gear 814 (e.g., right bevel gear).

As shown in FIG. 8, bevel gear 812, bevel gear 814, pinion 820 (e.g., left adjustment knob), pinion 822 (e.g., right adjustment knob), support brackets 830, screws 840, and e-rings 850 may each include a specific function in device 810. For instance, bevel gear 812 (e.g., left bevel gear) and bevel gear 814 (e.g., right bevel gear) are configured to adjust: (1) a left focal length of eye display 860 (e.g., a left eye display), (2) a right focal length of eye display 862 (e.g., a right eye display), and/or (3) a first eye distance of the device 810 (i.e., a length between the eye display 860 and the eye display 862 of the device 810). The pinion 820 (e.g., left adjustment knob) may be coupled to the bevel gear 812 to assist with the aforementioned adjustment. Also, the pinion 822 (e.g., right adjustment knob) may be coupled to the bevel gear 814 to assist with the aforementioned adjustment. Moreover, support brackets 830 may hold or lock pinion 820 (e.g., left adjustment knob) in place, as well as may hold or lock pinion 822 (e.g., right adjustment knob) in place. Additionally, the screws 840 may hold or lock support brackets 830 in place. Further, the e-rings 850 may hold or lock the movement of pinion 820 (e.g., hold or lock the linear movement of pinion 820), as well as may hold or lock the movement of pinion 822 (e.g., hold or lock the linear movement of pinion 822).

As depicted in FIG. 8, device 810 may include a left adjustment knob (e.g., pinion 820) and a right adjustment knob (e.g., pinion 822), as well as a left bevel gear (e.g., bevel gear 812) coupled to the left adjustment knob (e.g., pinion 820) and a right bevel gear (e.g., bevel gear 814) coupled to the right adjustment knob (e.g., pinion 822). In some aspects, the left bevel gear (e.g., bevel gear 812) and the right bevel gear (e.g., bevel gear 814) may be configured to adjust at least one of: (1) a left focal length of a left eye display (e.g., eye display 860) of the device 810 based on the left focal length being inequivalent to an inverse of a diopter value of a left eye of a user of the device 810, (2) a right focal length of a right eye display (e.g., eye display 862) based on the right focal length being inequivalent to an inverse of a diopter value of a right eye of the user of the device 810, or (3) a first eye distance of the device 810 based on the first eye distance being inequivalent to a second eye distance of the user. The first eye distance of the device may be a length between the left eye display (e.g., eye display 860) and the right eye display (e.g., eye display 862) of the device 810, the second eye distance of the user may be a length between the left eye of the user and the right eye of the user, the left focal length may be a distance between a center of the left eye display (e.g., eye display 860) and a focus of a lens in the left eye display, the right focal length may be a distance between a center of the right eye display (e.g., eye display 862) and a focus of a lens in the right eye display, the diopter value of the left eye of the user may be associated with a visual clarity of the left eye of the user, and the diopter value of the right eye of the user may be associated with a visual clarity of the right eye of the user. In some aspects, the lens in the left eye display may be an outermost lens in the left eye display and/or the lens in the right eye display may be an outermost lens in the right eye display. Additionally, device 810 may include at least one of a set of support brackets (e.g., support brackets 830), a set of e-rings (e.g., e-rings 850), or a set of screws (e.g., screws 840) coupled to at least one of the left adjustment knob (e.g., pinion 820) or the right adjustment knob (e.g., pinion 822), where at least one of the set of support brackets, the set of screws, or the set of e-rings is configured to hold the left adjustment knob in place with respect to the left bevel gear (e.g., bevel gear 812), and where at least one of the set of support brackets, the set of screws, or the set of e-rings is configured to hold the right adjustment knob in place with respect to the right bevel gear (e.g., bevel gear 814).

In some aspects, the left bevel gear (e.g., bevel gear 812) and the right bevel gear (e.g., bevel gear 814) may be configured to adjust the left focal length of the left eye display until the left focal length is approximately equivalent to the inverse of the diopter value of the left eye of the user, the left bevel gear (e.g., bevel gear 812) and the right bevel gear (e.g., bevel gear 814) may be configured to adjust the right focal length of the right eye display until the right focal length is approximately equivalent to the inverse of the diopter value of the right eye of the user, and/or the left bevel gear (e.g., bevel gear 812) and the right bevel gear (e.g., bevel gear 814) may be configured to adjust the first eye distance of the device until the first eye distance is approximately equivalent to the second eye distance of the user.

Also, the left focal length of the left eye display (e.g., eye display 860) may be approximately equivalent to the inverse of the diopter value of the left eye of the user if the visual clarity of the left eye of the user is approximately in focus, the right focal length of the right eye display (e.g., eye display 862) may be approximately equivalent to the inverse of the diopter value of the right eye of the user if the visual clarity of the right eye of the user is approximately in focus, and/or the first eye distance of the device 810 may be approximately equivalent to the second eye distance of the user if a pupil of the left eye of the user approximately matches the center of the left eye display (e.g., eye display 860) and a pupil of the right eye of the user approximately matches the center of the right eye display (e.g., eye display 862).

In some instances, an adjustment of the left adjustment knob (e.g., pinion 820) may be configured to trigger a rotational movement of the left bevel gear (e.g., bevel gear 812) that adjusts the left focal length of the left eye display (e.g., eye display 860), an adjustment of the right adjustment knob (e.g., pinion 822) may be configured to trigger a rotational movement of the right bevel gear (e.g., bevel gear 814) that adjusts the right focal length of the right eye display (e.g., eye display 862), and/or an adjustment of the left adjustment knob (e.g., pinion 820) may be configured to trigger a left movement or a right movement of the left bevel gear (e.g., bevel gear 812) that adjusts the first eye distance or an adjustment of the right adjustment knob (e.g., pinion 822) may be configured to trigger a left movement or a right movement of the right bevel gear (e.g., bevel gear 814) that adjusts the first eye distance. The adjustment of the left adjustment knob (e.g., pinion 820) in order to trigger the left movement of the left bevel gear (e.g., bevel gear 812) may include a movement of the left adjustment knob in a left direction in order trigger the left movement of the left bevel gear and expand a distance between the left bevel gear and the right bevel gear that increases the first eye distance of the device 810, and/or the adjustment of the right adjustment knob (e.g., pinion 822) in order to trigger the right movement of the right bevel gear (e.g., bevel gear 814) may include a movement of the right adjustment knob in a right direction in order trigger the right movement of the right bevel gear and expand a distance between the left bevel gear and the right bevel gear that increases the first eye distance of the device 810. Also, the adjustment of the left adjustment knob (e.g., pinion 820) in order to trigger the right movement of the left bevel gear (e.g., bevel gear 812) may include a movement of the left adjustment knob in a right direction in order to trigger the right movement of the left bevel gear and decrease a distance between the left bevel gear and the right bevel gear that decreases the first eye distance of the device 810, and/or the adjustment of the right adjustment knob (e.g., pinion 822) in order to trigger the left movement of the right bevel gear (e.g., bevel gear 814) may include a movement of the right adjustment knob in a left direction in order to trigger the left movement of the right bevel gear and decrease a distance between the left bevel gear and the right bevel gear that decreases the first eye distance of the device 810. Further, the adjustment of the left adjustment knob (e.g., pinion 820) in order to trigger the rotational movement of the left bevel gear (e.g., bevel gear 812) may include a rotation of the left adjustment knob in a clockwise fashion in order to trigger a clockwise movement of the left bevel gear that increases the left focal length of the left eye display (e.g., eye display 860), and/or the adjustment of the right adjustment knob (e.g., pinion 822) in order to trigger the rotational movement of the right bevel gear (e.g., bevel gear 814) may include a rotation of the right adjustment knob in a clockwise fashion in order to trigger a clockwise movement of the right bevel gear that increases the right focal length of the right eye display (e.g., eye display 862). Moreover, the adjustment of the left adjustment knob (e.g., pinion 820) in order to trigger the rotational movement of the left bevel gear (e.g., bevel gear 812) may include a rotation of the left adjustment knob in a counterclockwise fashion in order to trigger a counterclockwise movement of the left bevel gear that decreases the left focal length of the left eye display (e.g., eye display 860), and/or the adjustment of the right adjustment knob (e.g., pinion 822) in order to trigger the rotational movement of the right bevel gear (e.g., bevel gear 814) may include a rotation of the right adjustment knob in a counterclockwise fashion in order to trigger a counterclockwise movement of the right bevel gear that decreases the right focal length of the right eye display (e.g., eye display 862). In some aspects, at least one of the set of support brackets, the set of screws, or the set of e-rings may be configured to hold the left adjustment knob in place with respect to the left bevel gear, and/or at least one of the set of support brackets, the set of screws, or the set of e-rings may be configured to hold the right adjustment knob in place with respect to the right bevel gear. Also, the first eye distance of the device may be a length between the center of the left eye display and the center of the right eye display, the second eye distance of the user may be a length between a pupil of the left eye of the user and a pupil of the right eye of the user, the first eye distance of the device may be a first interpupillary distance (IPD), and/or the second eye distance of the user may be a second IPD.

Figure 9:
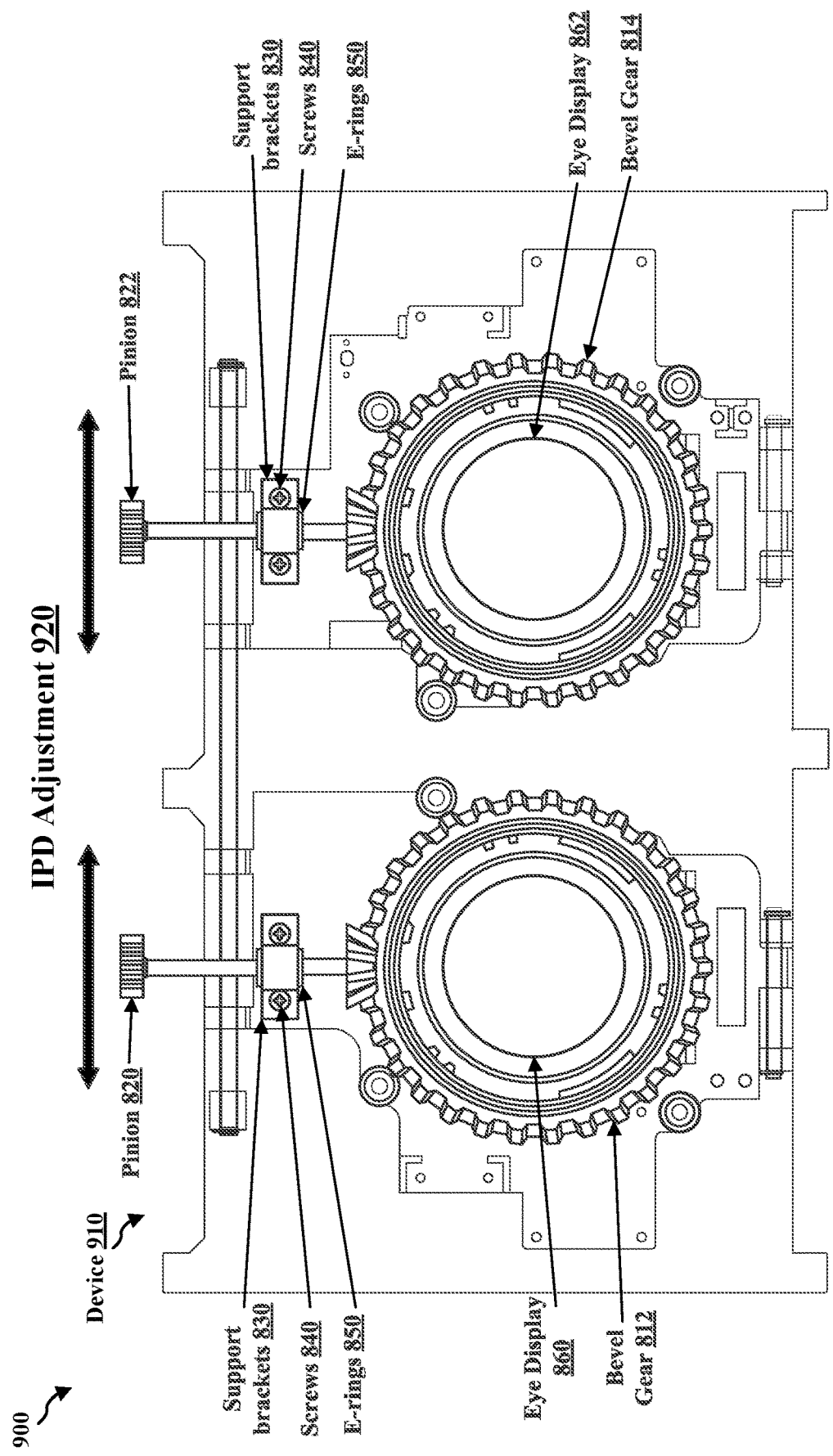
FIG. 9 is a diagram illustrating example device for IPD adjustment.

FIG. 9 is a diagram 900 illustrating an example device for adjusting the display at a headset or HMD. More specifically, FIG. 9 depicts an example display device for IPD adjustment. Device 910 in FIG. 9 is similar to device 810 in FIG. 8 (e.g., device 910 may include the same components as device 810). As shown in FIG. 9, diagram 900 includes device 910 for IPD adjustment including bevel gear 812 (e.g., left bevel gear), bevel gear 814 (e.g., right bevel gear), pinion 820 (e.g., left adjustment knob), pinion 822 (e.g., right adjustment knob), support brackets 830 (e.g., a set of support brackets), screws 840 (e.g., a set of screws), e-rings 850 (e.g., a set of e-rings, which are a type of retaining ring), eye display 860 (e.g., a left eye display), and eye display 862 (e.g., a right eye display). As depicted in FIG. 9, diagram 900 shows that pinion 820 (e.g., left adjustment knob) may be coupled to bevel gear 812 (e.g., left bevel gear) and pinion 822 (e.g., right adjustment knob) may be coupled to bevel gear 814 (e.g., right bevel gear). Further, pinion 820 (e.g., left adjustment knob) may be coupled to support brackets 830, screws 840, and e-rings 850. For instance, support brackets 830, screws 840, and e-rings 850 may be configured to hold the pinion 820 (e.g., left adjustment knob) in place with respect to the bevel gear 812 (e.g., left bevel gear). Also, pinion 822 (e.g., right adjustment knob) may be coupled to support brackets 830, screws 840, and e-rings 850. For example, support brackets 830, screws 840, and e-rings 850 may be configured to hold the pinion 822 (e.g., right adjustment knob) in place with respect to the bevel gear 814 (e.g., right bevel gear).

FIG. 9 depicts that device 910 may be configured to perform an IPD adjustment 920. For instance, the left bevel gear (e.g., bevel gear 812) and the right bevel gear (e.g., bevel gear 814) may be configured to adjust a first eye distance of the device 910 until the first eye distance is approximately equivalent to the second eye distance of a user of the device 910. Also, the first eye distance of the device 910 may be approximately equivalent to a second eye distance of the user if a pupil of the left eye of the user approximately matches the center of the left eye display (e.g., eye display 860) and a pupil of the right eye of the user approximately matches the center of the right eye display (e.g., eye display 862). In some instances, an adjustment of the left adjustment knob (e.g., pinion 820) may be configured to trigger a left movement or a right movement of the left bevel gear (e.g., bevel gear 812) that adjusts the first eye distance or an adjustment of the right adjustment knob (e.g., pinion 822) may be configured to trigger a left movement or a right movement of the right bevel gear (e.g., bevel gear 814) that adjusts the first eye distance. The adjustment of the left adjustment knob (e.g., pinion 820) in order to trigger the left movement of the left bevel gear (e.g., bevel gear 812) may include a movement of the left adjustment knob in a left direction in order trigger the left movement of the left bevel gear and expand a distance between the left bevel gear and the right bevel gear that increases the first eye distance of the device 910, and/or the adjustment of the right adjustment knob (e.g., pinion 822) in order to trigger the right movement of the right bevel gear (e.g., bevel gear 814) may include a movement of the right adjustment knob in a right direction in order trigger the right movement of the right bevel gear and expand a distance between the left bevel gear and the right bevel gear that increases the first eye distance of the device 910. Also, the adjustment of the left adjustment knob (e.g., pinion 820) in order to trigger the right movement of the left bevel gear (e.g., bevel gear 812) may include a movement of the left adjustment knob in a right direction in order to trigger the right movement of the left bevel gear and decrease a distance between the left bevel gear and the right bevel gear that decreases the first eye distance of the device 910, and/or the adjustment of the right adjustment knob (e.g., pinion 822) in order to trigger the left movement of the right bevel gear (e.g., bevel gear 814) may include a movement of the right adjustment knob in a left direction in order to trigger the left movement of the right bevel gear and decrease a distance between the left bevel gear and the right bevel gear that decreases the first eye distance of the device 910.

Figure 10:
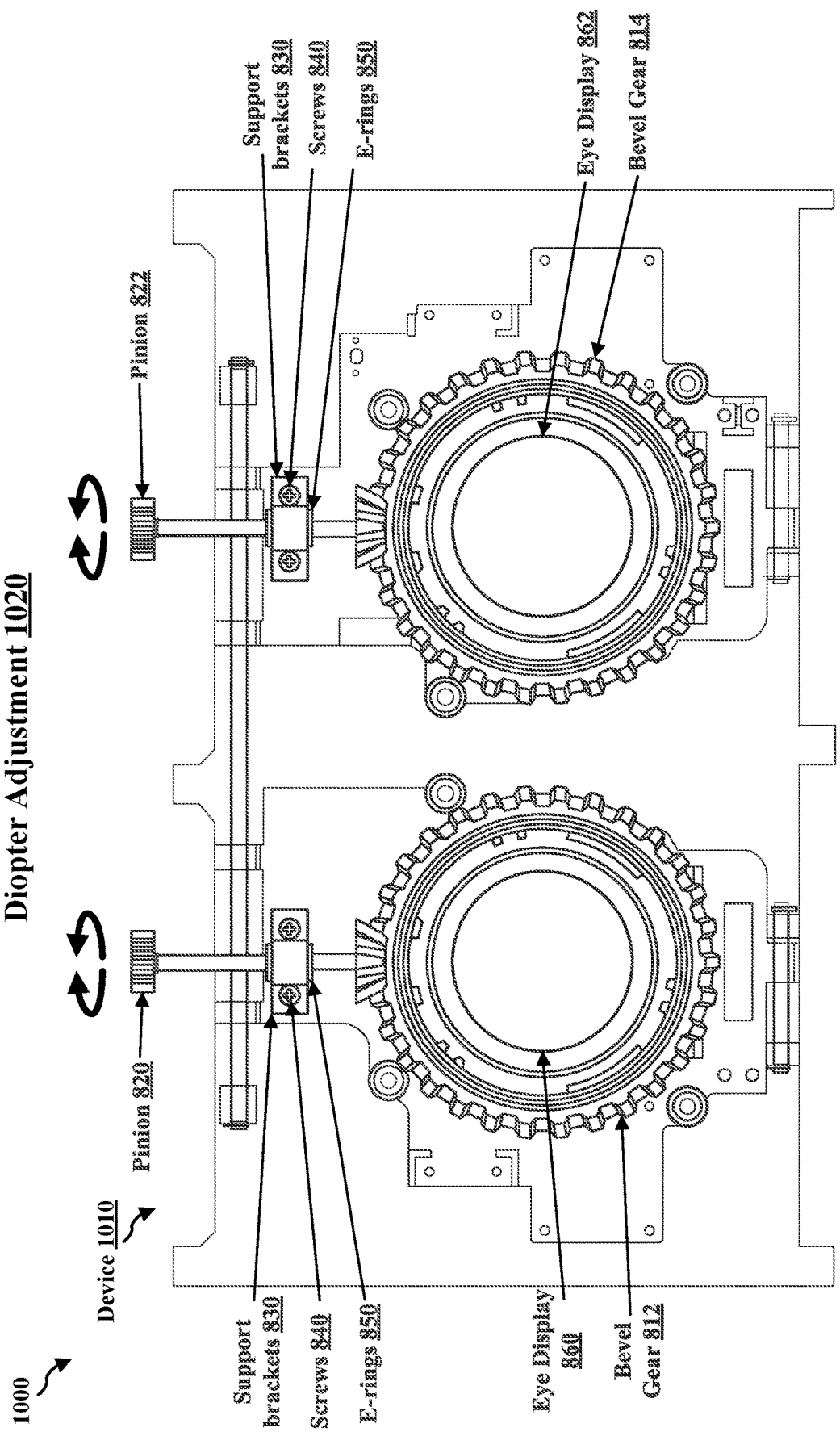
FIG. 10 is a diagram illustrating an example device for diopter adjustment.

FIG. 10 is a diagram 1000 illustrating an example device for adjusting the display at a headset or HMD. More specifically, FIG. 10 depicts an example display device for diopter adjustment. Device 1010 in FIG. 10 is similar to device 810 in FIG. 8 (e.g., device 1010 may include the same components as device 810). As shown in FIG. 10, diagram 1000 includes device 1010 for diopter adjustment including bevel gear 812 (e.g., left bevel gear), bevel gear 814 (e.g., right bevel gear), pinion 820 (e.g., left adjustment knob), pinion 822 (e.g., right adjustment knob), support brackets 830 (e.g., a set of support brackets), screws 840 (e.g., a set of screws), e-rings 850 (e.g., a set of e-rings, which are a type of retaining ring), eye display 860 (e.g., a left eye display), and eye display 862 (e.g., a right eye display). As depicted in FIG. 10, diagram 1000 shows that pinion 820 (e.g., left adjustment knob) may be coupled to bevel gear 812 (e.g., left bevel gear) and pinion 822 (e.g., right adjustment knob) may be coupled to bevel gear 814 (e.g., right bevel gear). Further, pinion 820 (e.g., left adjustment knob) may be coupled to support brackets 830, screws 840, and e-rings 850. For instance, support brackets 830, screws 840, and e-rings 850 may be configured to hold the pinion 820 (e.g., left adjustment knob) in place with respect to the bevel gear 812 (e.g., left bevel gear). Also, pinion 822 (e.g., right adjustment knob) may be coupled to support brackets 830, screws 840, and e-rings 850. For example, support brackets 830, screws 840, and e-rings 850 may be configured to hold the pinion 822 (e.g., right adjustment knob) in place with respect to the bevel gear 814 (e.g., right bevel gear).

FIG. 10 depicts that device 1010 may be configured to perform a diopter adjustment 1020. For instance, the left bevel gear (e.g., bevel gear 812) and the right bevel gear (e.g., bevel gear 814) may be configured to adjust the left focal length of the left eye display until the left focal length is approximately equivalent to the inverse of the diopter value of the left eye of the user, and/or the left bevel gear (e.g., bevel gear 812) and the right bevel gear (e.g., bevel gear 814) may be configured to adjust the right focal length of the right eye display until the right focal length is approximately equivalent to the inverse of the diopter value of the right eye of the user. Also, the left focal length of the left eye display (e.g., eye display 860) may be approximately equivalent to the inverse of the diopter value of the left eye of the user if the visual clarity of the left eye of the user is approximately in focus, and/or the right focal length of the right eye display (e.g., eye display 862) may be approximately equivalent to the inverse of the diopter value of the right eye of the user if the visual clarity of the right eye of the user is approximately in focus. In some instances, an adjustment of the left adjustment knob (e.g., pinion 820) may be configured to trigger a rotational movement of the left bevel gear (e.g., bevel gear 812) that adjusts the left focal length of the left eye display (e.g., eye display 860), and/or an adjustment of the right adjustment knob (e.g., pinion 822) may be configured to trigger a rotational movement of the right bevel gear (e.g., bevel gear 814) that adjusts the right focal length of the right eye display (e.g., eye display 862). The adjustment of the left adjustment knob (e.g., pinion 820) in order to trigger the rotational movement of the left bevel gear (e.g., bevel gear 812) may include a rotation of the left adjustment knob in a clockwise fashion in order to trigger a clockwise movement of the left bevel gear that increases the left focal length of the left eye display (e.g., eye display 860), and/or the adjustment of the right adjustment knob (e.g., pinion 822) in order to trigger the rotational movement of the right bevel gear (e.g., bevel gear 814) may include a rotation of the right adjustment knob in a clockwise fashion in order to trigger a clockwise movement of the right bevel gear that increases the right focal length of the right eye display (e.g., eye display 862). Moreover, the adjustment of the left adjustment knob (e.g., pinion 820) in order to trigger the rotational movement of the left bevel gear (e.g., bevel gear 812) may include a rotation of the left adjustment knob in a counterclockwise fashion in order to trigger a counterclockwise movement of the left bevel gear that decreases the left focal length of the left eye display (e.g., eye display 860), and/or the adjustment of the right adjustment knob (e.g., pinion 822) in order to trigger the rotational movement of the right bevel gear (e.g., bevel gear 814) may include a rotation of the right adjustment knob in a counterclockwise fashion in order to trigger a counterclockwise movement of the right bevel gear that decreases the right focal length of the right eye display (e.g., eye display 862).

Figure 11:
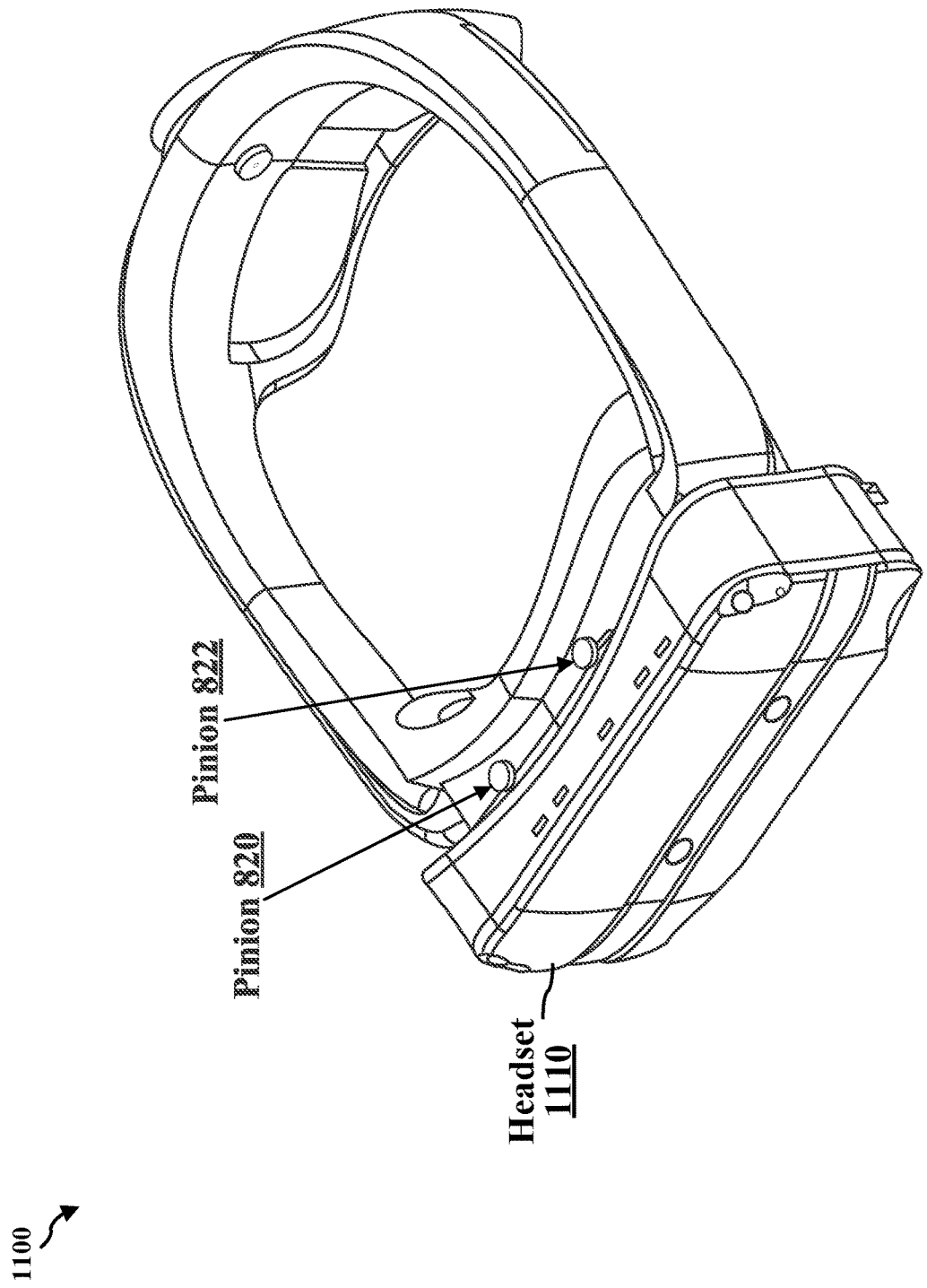
FIG. 11 is a diagram illustrating an example device for IPD and diopter adjustment at a headset.

FIG. 11 is a diagram 1100 illustrating an example device for adjusting the display at a headset or HMD. More specifically, FIG. 11 depicts an example display device for IPD and diopter adjustment at a headset 1110 (e.g., a headset or HMD). Headset 1110 in FIG. 11 is similar to device 810 in FIG. 8 (e.g., headset 1110 may include the same components as device 810). As shown in FIG. 11, diagram 1100 includes headset 1110 including pinion 820 (e.g., left adjustment knob) and pinion 822 (e.g., right adjustment knob). Headset 1110 also includes a number of components that are not shown in FIG. 11: bevel gear (e.g., left bevel gear), bevel gear (e.g., right bevel gear), support brackets (e.g., a set of support brackets), screws (e.g., a set of screws), e-rings (e.g., a set of e-rings, which are a type of retaining ring), eye display (e.g., a left eye display), and eye display (e.g., a right eye display). As depicted in FIG. 11, diagram 1100 shows that headset 1110 may include the aforementioned components for IPD and diopter adjustment, such as pinion 820 and pinion 822, as well as all of the aforementioned components that are not shown in FIG. 11. Indeed, device 810 and all of its corresponding components may be included in headset 1110 in FIG. 11. FIG. 11 depicts that device 810 may be used in conjunction with headset 1110 or another similar device (e.g., a headset or HMD).

Aspects presented herein may include a number of benefits or advantages. For instance, aspects presented herein may utilize a bevel mechanism for both IPD and diopter adjustment. In turn, this may reduce the amount of cost by reducing the manufacturing cost. Also, aspects presented herein may utilize a reduced number of components for the IPD and diopter adjustment (e.g., 6 components excluding hardware). Aspects presented herein may also utilize an individual movement of each lens along with a display for better adjustment of the IPD and diopter. Further, aspects presented herein may utilize two major components, which may make the device simple and include a robust setup. Additionally, aspects presented herein may utilize a reduced amount of space in the device, utilize a reduced amount effort in order to operate the device, and/or utilize a reduced amount of effort in order to assemble the device.

Figure 12:
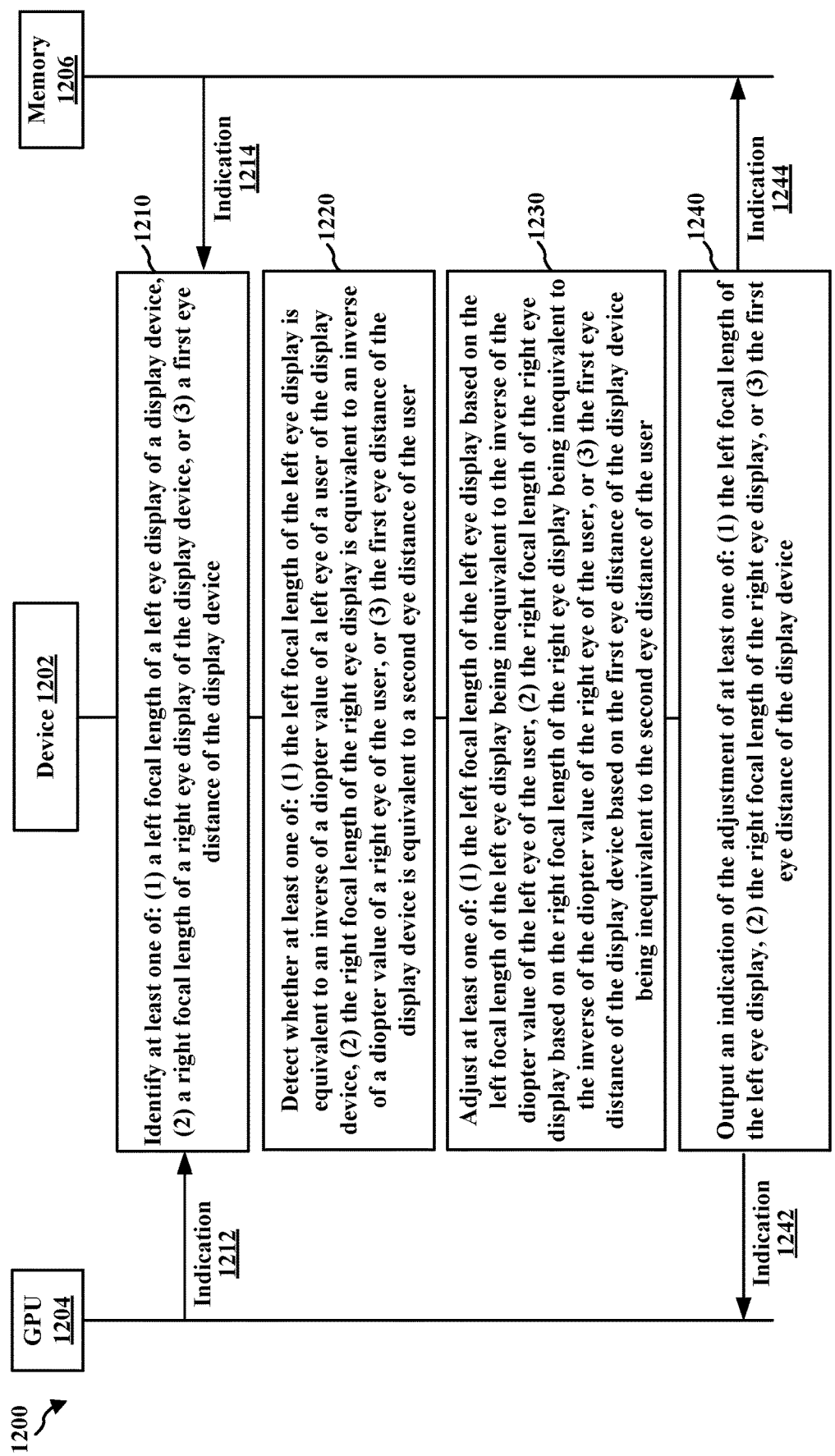
FIG. 12 is a communication flow diagram illustrating example communications between a device, a GPU, and a memory.

FIG. 12 is a communication flow diagram 1200 of device adjustment in accordance with one or more techniques of this disclosure. As shown in FIG. 12, diagram 1200 includes example communications between a device 1202 (e.g., a device for IPD adjustment and/or diopter adjustment), a GPU 1204 (e.g., a GPU, a GPU component, another graphics processor, a CPU, a CPU component, or another central processor), and memory 1206 (e.g., a system memory, a graphics memory, or a memory or cache at a GPU), in accordance with one or more techniques of this disclosure.

At 1210, device 1202 may identify at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display. Device 1202 may perform the identification based on receiving an indication or retrieving an indication. For example, device 1202 may receive, from GPU 1204, an indication (e.g., indication 1212) of at least one of: (1) a left focal length of a left eye display of a display device, (2) a right focal length of a right eye display of the display device, or (3) a first eye distance of the display device. Also, device 1202 may retrieve, from memory 1206, an indication (e.g., indication 1214) of at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display.

At 1220, device 1202 may detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user.

At 1230, device 1202 may adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user. Also, the first eye distance of the display device may be a length between the center of the left eye display and the center of the right eye display, the second eye distance of the user may be a length between a pupil of the left eye of the user and a pupil of the right eye of the user, the first eye distance of the display device may be a first interpupillary distance (IPD), and the second eye distance of the user may be a second IPD.

In some aspects, adjusting the left focal length may include adjusting the left focal length until the left focal length is approximately equivalent to the inverse of the diopter value of the left eye of the user. Also, adjusting the right focal length may include adjusting the right focal length until the right focal length is approximately equivalent to the inverse of the diopter value of the right eye of the user. And adjusting the first eye distance may include adjusting the first eye distance of the display device until the first eye distance is approximately equivalent to the second eye distance of the user. The left focal length of the left eye display may be approximately equivalent to the inverse of the diopter value of the left eye of the user if the visual clarity of the left eye of the user is approximately in focus. The right focal length of the right eye display may be approximately equivalent to the inverse of the diopter value of the right eye of the user if the visual clarity of the right eye of the user is approximately in focus. The first eye distance of the display device may be approximately equivalent to the second eye distance of the user if a pupil of the left eye of the user approximately matches the center of the left eye display and a pupil of the right eye of the user approximately matches the center of the right eye display. In some instances, adjusting at least one of: (1) the left focal length of the left eye display, (2) the right focal length of the right eye display, or (3) the first eye distance of the display device may include: adjusting at least one of: (1) the left focal length of the left eye display, (2) the right focal length of the right eye display, or (3) the first eye distance of the display device with at least one of: a left adjustment knob, a right adjustment knob, a left bevel gear, a right bevel gear, a set of support brackets, a set of e-rings, or a set of screws. In some instances, at least one of the set of support brackets, the set of screws, or the set of e-rings may be configured to hold the left adjustment knob in place with respect to the left bevel gear, and/or at least one of the set of support brackets, the set of screws, or the set of e-rings may be configured to hold the right adjustment knob in place with respect to the right bevel gear.

In some aspects, adjusting the left focal length of the left eye display may include: adjusting the left adjustment knob in order to trigger a rotational movement of the left bevel gear that adjusts the left focal length of the left eye display; adjusting the right focal length of the right eye display may include: adjusting the right adjustment knob in order to trigger a rotational movement of the right bevel gear that adjusts the right focal length of the right eye display; and adjusting the first eye distance of the display device may include: adjusting the left adjustment knob in order to trigger a left movement or a right movement of the left bevel gear that adjusts the first eye distance or adjusting the right adjustment knob in order to trigger a left movement or a right movement of the right bevel gear that adjusts the first eye distance. Also, adjusting the left adjustment knob in order to trigger the left movement of the left bevel gear may include: moving the left adjustment knob in a left direction in order to trigger the left movement of the left bevel gear and expand a distance between the left bevel gear and the right bevel gear that increases the first eye distance of the display device; and adjusting the right adjustment knob in order to trigger the right movement of the right bevel gear may include: moving the right adjustment knob in a right direction in order to trigger the right movement of the right bevel gear and expand a distance between the left bevel gear and the right bevel gear that increases the first eye distance of the display device. Further, adjusting the left adjustment knob in order to trigger the right movement of the left bevel gear may include: moving the left adjustment knob in a right direction in order to trigger the right movement of the left bevel gear and decrease a distance between the left bevel gear and the right bevel gear that decreases the first eye distance of the display device; and adjusting the right adjustment knob in order to trigger the left movement of the right bevel gear may include: moving the right adjustment knob in a left direction in order to trigger the left movement of the right bevel gear and decrease a distance between the left bevel gear and the right bevel gear that decreases the first eye distance of the display device. Additionally, adjusting the left adjustment knob in order to trigger the rotational movement of the left bevel gear may include: rotating the left adjustment knob in a clockwise fashion in order to trigger a clockwise movement of the left bevel gear that increases the left focal length of the left eye display; and adjusting the right adjustment knob in order to trigger the rotational movement of the right bevel gear may include: rotating the right adjustment knob in a clockwise fashion in order to trigger a clockwise movement of the right bevel gear that increases the right focal length of the right eye display. Moreover, adjusting the left adjustment knob in order to trigger the rotational movement of the left bevel gear may include: rotating the left adjustment knob in a counterclockwise fashion in order to trigger a counterclockwise movement of the left bevel gear that decreases the left focal length of the left eye display; and adjusting the right adjustment knob in order to trigger the rotational movement of the right bevel gear may include: rotating the right adjustment knob in a counterclockwise fashion in order to trigger a counterclockwise movement of the right bevel gear that decreases the right focal length of the right eye display.

At 1240, device 1202 may output an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device. In some aspects, outputting the indication of the adjustment may include transmitting the indication of the adjustment and/or storing the indication of the adjustment. For example, device 1202 may transmit, to the GPU 1204, the indication (e.g., indication 1242) of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device. Also, device 1202 may store, in the memory 1206, the indication (e.g., indication 1244) of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device.

Figure 13:
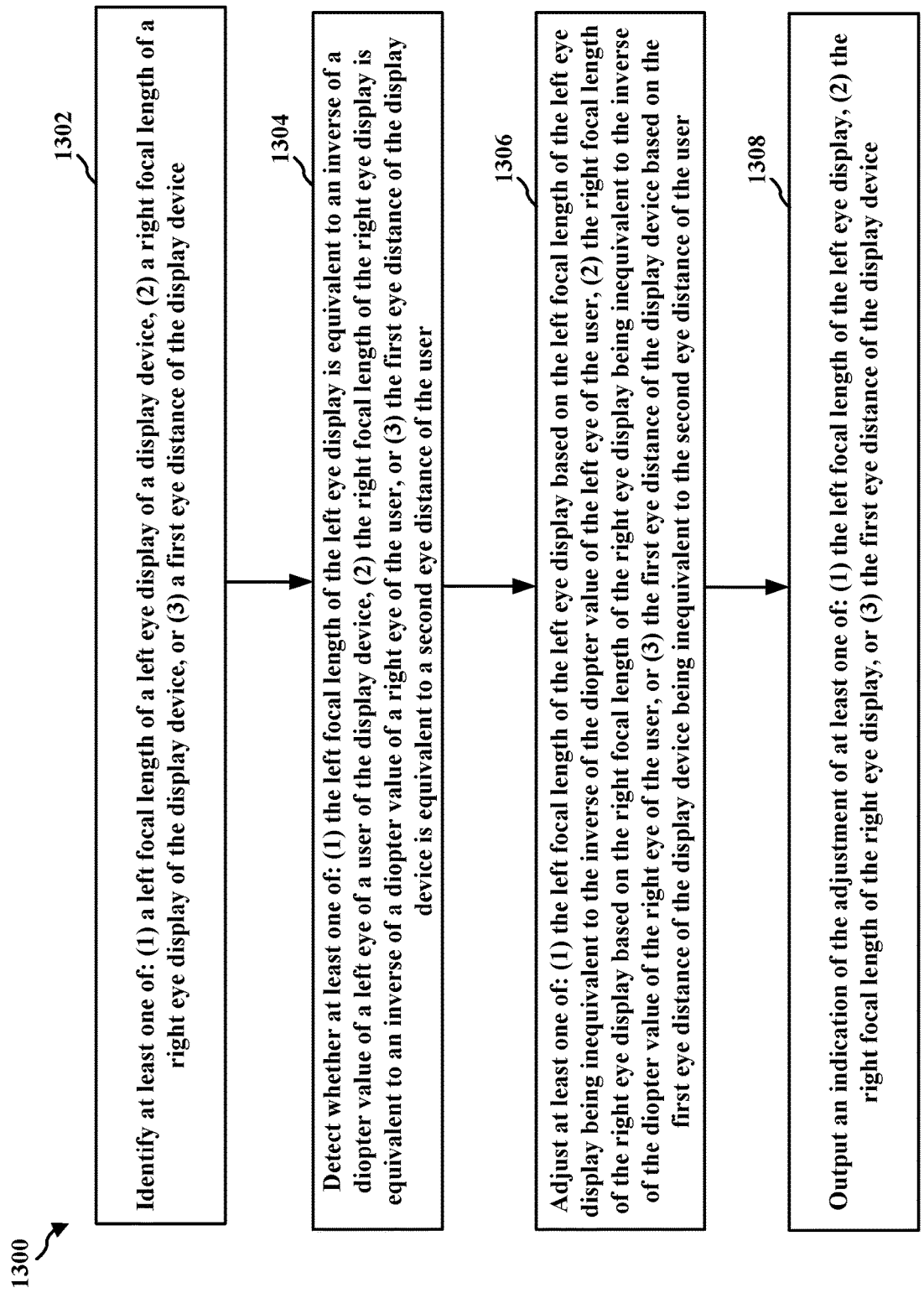
FIG. 13 is a flowchart of an example method of device adjustment.

FIG. 13 is a flowchart 1300 of an example method of device adjustment in accordance with one or more techniques of this disclosure. The method may be performed by a device (e.g., a device for IPD adjustment and/or diopter adjustment), a GPU (e.g., a GPU, a GPU component, another graphics processor, a CPU, a CPU component, or another central processor), a CPU (a CPU, a CPU component, another central processor, a GPU, a GPU component, or another graphics processor), a display driver integrated circuit (DDIC), an apparatus for device adjustment, a wireless communication device, and/or any apparatus that may perform device adjustment as used in connection with the examples of FIGS. 1-12.

At 1302, the device may identify at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display, as described in connection with the examples in FIGS. 1-12. For example, as described in 1210 of FIG. 12, device 1202 may identify at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display. Further, step 1302 may be performed by display processor 127 in FIG. 1. The device may perform the identification based on receiving an indication or retrieving an indication. For example, device may receive an indication of at least one of: (1) a left focal length of a left eye display of a display device, (2) a right focal length of a right eye display of the display device, or (3) a first eye distance of the display device. Also, the device may retrieve, from a memory, an indication of at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display.

At 1304, the device may detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user, as described in connection with the examples in FIGS. 1-12. For example, as described in 1220 of FIG. 12, device 1202 may detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user. Further, step 1304 may be performed by display processor 127 in FIG. 1.

At 1306, the device may adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user, as described in connection with the examples in FIGS. 1-12. For example, as described in 1230 of FIG. 12, device 1202 may adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user. Further, step 1306 may be performed by display processor 127 in FIG. 1. Also, the first eye distance of the display device may be a length between the center of the left eye display and the center of the right eye display, the second eye distance of the user may be a length between a pupil of the left eye of the user and a pupil of the right eye of the user, the first eye distance of the display device may be a first interpupillary distance (IPD), and the second eye distance of the user may be a second IPD.

In some aspects, adjusting the left focal length may include adjusting the left focal length until the left focal length is approximately equivalent to the inverse of the diopter value of the left eye of the user. Also, adjusting the right focal length may include adjusting the right focal length until the right focal length is approximately equivalent to the inverse of the diopter value of the right eye of the user. And adjusting the first eye distance may include adjusting the first eye distance of the display device until the first eye distance is approximately equivalent to the second eye distance of the user. The left focal length of the left eye display may be approximately equivalent to the inverse of the diopter value of the left eye of the user if the visual clarity of the left eye of the user is approximately in focus. The right focal length of the right eye display may be approximately equivalent to the inverse of the diopter value of the right eye of the user if the visual clarity of the right eye of the user is approximately in focus. The first eye distance of the display device may be approximately equivalent to the second eye distance of the user if a pupil of the left eye of the user approximately matches the center of the left eye display and a pupil of the right eye of the user approximately matches the center of the right eye display. In some instances, adjusting at least one of: (1) the left focal length of the left eye display, (2) the right focal length of the right eye display, or (3) the first eye distance of the display device may include: adjusting at least one of: (1) the left focal length of the left eye display, (2) the right focal length of the right eye display, or (3) the first eye distance of the display device with at least one of: a left adjustment knob, a right adjustment knob, a left bevel gear, a right bevel gear, a set of support brackets, a set of e-rings, or a set of screws. In some instances, at least one of the set of support brackets, the set of screws, or the set of e-rings may be configured to hold the left adjustment knob in place with respect to the left bevel gear, and/or at least one of the set of support brackets, the set of screws, or the set of e-rings may be configured to hold the right adjustment knob in place with respect to the right bevel gear.

In some aspects, adjusting the left focal length of the left eye display may include: adjusting the left adjustment knob in order to trigger a rotational movement of the left bevel gear that adjusts the left focal length of the left eye display; adjusting the right focal length of the right eye display may include: adjusting the right adjustment knob in order to trigger a rotational movement of the right bevel gear that adjusts the right focal length of the right eye display; and adjusting the first eye distance of the display device may include: adjusting the left adjustment knob in order to trigger a left movement or a right movement of the left bevel gear that adjusts the first eye distance or adjusting the right adjustment knob in order to trigger a left movement or a right movement of the right bevel gear that adjusts the first eye distance. Also, adjusting the left adjustment knob in order to trigger the left movement of the left bevel gear may include: moving the left adjustment knob in a left direction in order to trigger the left movement of the left bevel gear and expand a distance between the left bevel gear and the right bevel gear that increases the first eye distance of the display device; and adjusting the right adjustment knob in order to trigger the right movement of the right bevel gear may include: moving the right adjustment knob in a right direction in order to trigger the right movement of the right bevel gear and expand a distance between the left bevel gear and the right bevel gear that increases the first eye distance of the display device. Further, adjusting the left adjustment knob in order to trigger the right movement of the left bevel gear may include: moving the left adjustment knob in a right direction in order to trigger the right movement of the left bevel gear and decrease a distance between the left bevel gear and the right bevel gear that decreases the first eye distance of the display device; and adjusting the right adjustment knob in order to trigger the left movement of the right bevel gear may include: moving the right adjustment knob in a left direction in order to trigger the left movement of the right bevel gear and decrease a distance between the left bevel gear and the right bevel gear that decreases the first eye distance of the display device. Additionally, adjusting the left adjustment knob in order to trigger the rotational movement of the left bevel gear may include: rotating the left adjustment knob in a clockwise fashion in order to trigger a clockwise movement of the left bevel gear that increases the left focal length of the left eye display; and adjusting the right adjustment knob in order to trigger the rotational movement of the right bevel gear may include: rotating the right adjustment knob in a clockwise fashion in order to trigger a clockwise movement of the right bevel gear that increases the right focal length of the right eye display. Moreover, adjusting the left adjustment knob in order to trigger the rotational movement of the left bevel gear may include: rotating the left adjustment knob in a counterclockwise fashion in order to trigger a counterclockwise movement of the left bevel gear that decreases the left focal length of the left eye display; and adjusting the right adjustment knob in order to trigger the rotational movement of the right bevel gear may include: rotating the right adjustment knob in a counterclockwise fashion in order to trigger a counterclockwise movement of the right bevel gear that decreases the right focal length of the right eye display.

At 1308, the device may output an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device, as described in connection with the examples in FIGS. 1-12. For example, as described in 1240 of FIG. 12, device 1202 may output an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device. Further, step 1308 may be performed by display processor 127 in FIG. 1. In some aspects, outputting the indication of the adjustment may include transmitting the indication of the adjustment and/or storing the indication of the adjustment. For example, the device may transmit the indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device. Also, the device may store, in a memory, the indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device.

In configurations, a method or an apparatus for device adjustment is provided. The apparatus may be a device (e.g., a device for IPD or diopter adjustment), a GPU (or other graphics processor), a CPU (or other central processor), a DDIC, an apparatus for device adjustment, and/or some other processor that may perform device adjustment. In aspects, the apparatus may be the display processor 127 within the device 104, or may be some other hardware within the device 104 or another device. The apparatus, e.g., display processor 127, may include means for identifying at least one of: (1) a left focal length of a left eye display of a display device, (2) a right focal length of a right eye display of the display device, or (3) a first eye distance of the display device, where the left focal length is a distance between a center of the left eye display and a focus of a lens in the left eye display, where the right focal length is a distance between a center of the right eye display and a focus of a lens in the right eye display, and where the first eye distance of the display device is a length between the left eye display and the right eye display. The apparatus, e.g., display processor 127, may also include means for detecting whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, where the diopter value of the left eye of the user is associated with a visual clarity of the left eye of the user, where the diopter value of the right eye of the user is associated with a visual clarity of the right eye of the user, and where the second eye distance of the user is a length between the left eye of the user and the right eye of the user. The apparatus, e.g., display processor 127, may also include means for adjusting at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user. The apparatus, e.g., display processor 127, may also include means for outputting an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device.

The subject matter described herein may be implemented to realize one or more benefits or advantages. For instance, the described device adjustment techniques may be used by a device, a GPU, a CPU, a central processor, or some other processor that may perform device adjustment to implement the IPD and diopter adjustment techniques described herein. This may also be accomplished at a low cost compared to other device adjustment techniques. Moreover, the device adjustment techniques herein may improve or speed up data processing or execution. Further, the device adjustment techniques herein may improve resource or data utilization and/or resource efficiency. Additionally, aspects of the present disclosure may utilize IPD and diopter adjustment techniques in order to improve memory bandwidth efficiency and/or increase processing speed at a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for device adjustment, including (i.e., comprising) at least one memory and at least one processor coupled to the at least one memory and, based at least in part on information stored in the at least one memory, the at least one processor, individually or in combination, is configured to: identify at least one of: (1) a left focal length of a left eye display of a display device, (2) a right focal length of a right eye display of the display device, or (3) a first eye distance of the display device, wherein the left focal length is a distance between a center of the left eye display and a focus of a lens in the left eye display, wherein the right focal length is a distance between a center of the right eye display and a focus of a lens in the right eye display, and wherein the first eye distance of the display device is a length between the left eye display and the right eye display; detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, wherein the diopter value of the left eye of the user is associated with a visual clarity of the left eye of the user, wherein the diopter value of the right eye of the user is associated with a visual clarity of the right eye of the user, and wherein the second eye distance of the user is a length between the left eye of the user and the right eye of the user; and adjust at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device based on the first eye distance of the display device being inequivalent to the second eye distance of the user.

Aspect 2 is the apparatus of aspect 1, wherein to adjust the left focal length, the at least one processor is configured to adjust the left focal length until the left focal length is approximately equivalent to the inverse of the diopter value of the left eye of the user; wherein to adjust the right focal length, the at least one processor is configured to adjust the right focal length until the right focal length is approximately equivalent to the inverse of the diopter value of the right eye of the user; and wherein to adjust the first eye distance, the at least one processor is configured to adjust the first eye distance of the display device until the first eye distance is approximately equivalent to the second eye distance of the user.

Aspect 3 is the apparatus of aspect 2, wherein the left focal length of the left eye display is approximately equivalent to the inverse of the diopter value of the left eye of the user if the visual clarity of the left eye of the user is approximately in focus; wherein the right focal length of the right eye display is approximately equivalent to the inverse of the diopter value of the right eye of the user if the visual clarity of the right eye of the user is approximately in focus; and wherein the first eye distance of the display device is approximately equivalent to the second eye distance of the user if a pupil of the left eye of the user approximately matches the center of the left eye display and a pupil of the right eye of the user approximately matches the center of the right eye display.

Aspect 4 is the apparatus of any of aspects 2 to 3, wherein to adjust at least one of: (1) the left focal length of the left eye display, (2) the right focal length of the right eye display, or (3) the first eye distance of the display device, the at least one processor is configured to: adjust at least one of: (1) the left focal length of the left eye display, (2) the right focal length of the right eye display, or (3) the first eye distance of the display device with at least one of: a left adjustment knob, a right adjustment knob, a left bevel gear, a right bevel gear, a set of support brackets, a set of e-rings, or a set of screws.

Aspect 5 is the apparatus of aspect 4, wherein to adjust the left focal length of the left eye display, the at least one processor is configured to: adjust the left adjustment knob in order to trigger a rotational movement of the left bevel gear that adjusts the left focal length of the left eye display; wherein to adjust the right focal length of the right eye display, the at least one processor is configured to: adjust the right adjustment knob in order to trigger a rotational movement of the right bevel gear that adjusts the right focal length of the right eye display; and wherein to adjust the first eye distance of the display device, the at least one processor is configured to: adjust the left adjustment knob in order to trigger a left movement or a right movement of the left bevel gear that adjusts the first eye distance or adjusting the right adjustment knob in order to trigger a left movement or a right movement of the right bevel gear that adjusts the first eye distance.

Aspect 6 is the apparatus of aspect 5, wherein to adjust the left adjustment knob in order to trigger the left movement of the left bevel gear, the at least one processor is configured to: move the left adjustment knob in a left direction in order to trigger the left movement of the left bevel gear and expand a distance between the left bevel gear and the right bevel gear that increases the first eye distance of the display device; and wherein to adjust the right adjustment knob in order to trigger the right movement of the right bevel gear, the at least one processor is configured to: move the right adjustment knob in a right direction in order to trigger the right movement of the right bevel gear and expand a distance between the left bevel gear and the right bevel gear that increases the first eye distance of the display device.

Aspect 7 is the apparatus of any of aspects 5 to 6, wherein to adjust the left adjustment knob in order to trigger the right movement of the left bevel gear, the at least one processor is configured to: move the left adjustment knob in a right direction in order to trigger the right movement of the left bevel gear and decrease a distance between the left bevel gear and the right bevel gear that decreases the first eye distance of the display device; and wherein to adjust the right adjustment knob in order to trigger the left movement of the right bevel gear, the at least one processor is configured to: move the right adjustment knob in a left direction in order to trigger the left movement of the right bevel gear and decrease a distance between the left bevel gear and the right bevel gear that decreases the first eye distance of the display device.

Aspect 8 is the apparatus of any of aspects 5 to 7, where to adjust the left adjustment knob in order to trigger the rotational movement of the left bevel gear, the at least one processor is configured to: rotate the left adjustment knob in a clockwise fashion in order to trigger a clockwise movement of the left bevel gear that increases the left focal length of the left eye display; and wherein to adjust the right adjustment knob in order to trigger the rotational movement of the right bevel gear, the at least one processor is configured to: rotate the right adjustment knob in a clockwise fashion in order to trigger a clockwise movement of the right bevel gear that increases the right focal length of the right eye display.

Aspect 9 is the apparatus of any of aspects 5 to 8, wherein to adjust the left adjustment knob in order to trigger the rotational movement of the left bevel gear, the at least one processor is configured to: rotate the left adjustment knob in a counterclockwise fashion in order to trigger a counterclockwise movement of the left bevel gear that decreases the left focal length of the left eye display; and wherein to adjust the right adjustment knob in order to trigger the rotational movement of the right bevel gear, the at least one processor is configured to: rotate the right adjustment knob in a counterclockwise fashion in order to trigger a counterclockwise movement of the right bevel gear that decreases the right focal length of the right eye display.

Aspect 10 is the apparatus of any of aspects 4 to 9, wherein at least one of the set of support brackets, the set of screws, or the set of e-rings is configured to hold the left adjustment knob in place with respect to the left bevel gear, and wherein at least one of the set of support brackets, the set of screws, or the set of e-rings is configured to hold the right adjustment knob in place with respect to the right bevel gear.

Aspect 11 is the apparatus of any of aspects 1 to 10, wherein the first eye distance of the display device is a length between the center of the left eye display and the center of the right eye display, wherein the second eye distance of the user is a length between a pupil of the left eye of the user and a pupil of the right eye of the user, wherein the first eye distance of the display device is a first interpupillary distance (IPD), and wherein the second eye distance of the user is a second IPD.

Aspect 12 is the apparatus of aspect 11, wherein the at least one processor is configured to: output an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device.

Aspect 13 is the apparatus of aspect 12, wherein the apparatus is a wireless communication device further including (i.e., comprising): a transceiver coupled to the at least one processor, wherein to output the indication of the adjustment, the at least one processor is configured to output, via the transceiver, the indication of the adjustment.

Aspect 14 is a method of device adjustment for implementing any of aspects 1 to 13.

Aspect 15 is an apparatus for device adjustment including means for implementing any of aspects 1 to 13.

Aspect 16 is a computer-readable medium (e.g., a non-transitory computer-readable medium) storing computer executable code, the code when executed by at least one processor causes the at least one processor to implement any of aspects 1 to 13.

Aspect 17 is a device, comprising: a left adjustment knob and a right adjustment knob; and a left bevel gear coupled to the left adjustment knob and a right bevel gear coupled to the right adjustment knob; wherein the left bevel gear and the right bevel gear are configured to adjust at least one of (1) a left focal length of a left eye display of the device based on the left focal length being inequivalent to an inverse of a diopter value of a left eye of a user of the device, (2) a right focal length of a right eye display based on the right focal length being inequivalent to an inverse of a diopter value of a right eye of the user, or (3) a first eye distance of the device based on the first eye distance being inequivalent to a second eye distance of the user, wherein the first eye distance of the device is a length between the left eye display and the right eye display of the device, wherein the second eye distance of the user is a length between the left eye of the user and the right eye of the user, wherein the left focal length is a distance between a center of the left eye display and a focus of a lens in the left eye display, wherein the right focal length is a distance between a center of the right eye display and a focus of a lens in the right eye display, wherein the diopter value of the left eye of the user is associated with a visual clarity of the left eye of the user, wherein the diopter value of the right eye of the user is associated with a visual clarity of the right eye of the user.

Aspect 18 is the apparatus of aspect 17, further comprising: at least one of a set of support brackets, a set of e-rings, or a set of screws coupled to at least one of the left adjustment knob or the right adjustment knob, wherein at least one of the set of support brackets, the set of screws, or the set of e-rings is configured to hold the left adjustment knob in place with respect to the left bevel gear, and wherein at least one of the set of support brackets, the set of screws, or the set of e-rings is configured to hold the right adjustment knob in place with respect to the right bevel gear.

Aspect 19 is the apparatus of any of aspects 17 to 18, wherein the left bevel gear and the right bevel gear are configured to adjust the left focal length of the left eye display until the left focal length is approximately equivalent to the inverse of the diopter value of the left eye of the user; wherein the left bevel gear and the right bevel gear are configured to adjust the right focal length of the right eye display until the right focal length is approximately equivalent to the inverse of the diopter value of the right eye of the user; and wherein the left bevel gear and the right bevel gear are configured to adjust the first eye distance of the device until the first eye distance is approximately equivalent to the second eye distance of the user.

Aspect 20 is the apparatus of aspect 19, wherein the left focal length of the left eye display is approximately equivalent to the inverse of the diopter value of the left eye of the user if the visual clarity of the left eye of the user is approximately in focus; wherein the right focal length of the right eye display is approximately equivalent to the inverse of the diopter value of the right eye of the user if the visual clarity of the right eye of the user is approximately in focus; and wherein the first eye distance of the device is approximately equivalent to the second eye distance of the user if a pupil of the left eye of the user approximately matches the center of the left eye display and a pupil of the right eye of the user approximately matches the center of the right eye display.

Aspect 21 is the apparatus of any of aspects 19 to 20, wherein an adjustment of the left adjustment knob is configured to trigger a rotational movement of the left bevel gear that adjusts the left focal length of the left eye display; wherein an adjustment of the right adjustment knob is configured to trigger a rotational movement of the right bevel gear that adjusts the right focal length of the right eye display; and wherein an adjustment of the left adjustment knob is configured to trigger a left movement or a right movement of the left bevel gear that adjusts the first eye distance or an adjustment of the right adjustment knob is configured to trigger a left movement or a right movement of the right bevel gear that adjusts the first eye distance.

Aspect 22 is the apparatus of aspect 21, wherein the adjustment of the left adjustment knob in order to trigger the left movement of the left bevel gear comprises: a movement of the left adjustment knob in a left direction in order trigger the left movement of the left bevel gear and expand a distance between the left bevel gear and the right bevel gear that increases the first eye distance of the device; and wherein the adjustment of the right adjustment knob in order to trigger the right movement of the right bevel gear comprises: a movement of the right adjustment knob in a right direction in order trigger the right movement of the right bevel gear and expand a distance between the left bevel gear and the right bevel gear that increases the first eye distance of the device.

Aspect 23 is the apparatus of any of aspects 21 to 22, wherein the adjustment of the left adjustment knob in order to trigger the right movement of the left bevel gear comprises: a movement of the left adjustment knob in a right direction in order to trigger the right movement of the left bevel gear and decrease a distance between the left bevel gear and the right bevel gear that decreases the first eye distance of the device; and wherein the adjustment of the right adjustment knob in order to trigger the left movement of the right bevel gear comprises: a movement of the right adjustment knob in a left direction in order to trigger the left movement of the right bevel gear and decrease a distance between the left bevel gear and the right bevel gear that decreases the first eye distance of the device.

Aspect 24 is the apparatus of any of aspects 21 to 23, wherein the adjustment of the left adjustment knob in order to trigger the rotational movement of the left bevel gear comprises: a rotation of the left adjustment knob in a clockwise fashion in order to trigger a clockwise movement of the left bevel gear that increases the left focal length of the left eye display; and wherein the adjustment of the right adjustment knob in order to trigger the rotational movement of the right bevel gear comprises: a rotation of the right adjustment knob in a clockwise fashion in order to trigger a clockwise movement of the right bevel gear that increases the right focal length of the right eye display.

Aspect 25 is the apparatus of any of aspects 21 to 24, wherein the adjustment of the left adjustment knob in order to trigger the rotational movement of the left bevel gear comprises: a rotation of the left adjustment knob in a counterclockwise fashion in order to trigger a counterclockwise movement of the left bevel gear that decreases the left focal length of the left eye display; and wherein the adjustment of the right adjustment knob in order to trigger the rotational movement of the right bevel gear comprises: a rotation of the right adjustment knob in a counterclockwise fashion in order to trigger a counterclockwise movement of the right bevel gear that decreases the right focal length of the right eye display.

Aspect 26 is the apparatus of any of aspects 21 to 25, wherein at least one of the set of support brackets, the set of screws, or the set of e-rings is configured to hold the left adjustment knob in place with respect to the left bevel gear, and wherein at least one of the set of support brackets, the set of screws, or the set of e-rings is configured to hold the right adjustment knob in place with respect to the right bevel gear.

Aspect 27 is the apparatus of any of aspects 17 to 26, wherein the first eye distance of the device is a length between the center of the left eye display and the center of the right eye display, wherein the second eye distance of the user is a length between a pupil of the left eye of the user and a pupil of the right eye of the user, wherein the first eye distance of the device is a first interpupillary distance (IPD), and wherein the second eye distance of the user is a second IPD.

What is claimed is:

1. A method of device adjustment, comprising:
   identifying at least one of: (1) a left focal length of a left eye display of a display device, (2) a right focal length of a right eye display of the display device, or (3) a first eye distance of the display device, wherein the left focal length is a distance between a center of the left eye display and a focus of a lens in the left eye display, wherein the right focal length is a distance between a center of the right eye display and a focus of a lens in the right eye display, and wherein the first eye distance of the display device is a length between the left eye display and the right eye display;
   detecting whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, wherein the diopter value of the left eye of the user is associated with a visual clarity of the left eye of the user, wherein the diopter value of the right eye of the user is associated with a visual clarity of the right eye of the user, and wherein the second eye distance of the user is a length between the left eye of the user and the right eye of the user; and
   adjusting at least one of: (1) the left focal length of the left eye display until the left focal length is approximately equivalent to the inverse of the diopter value of the left eye of the user based on the left focal length of the left eye display being inequivalent to the inverse of the diopter value of the left eye of the user, (2) the right focal length of the right eye display until the right focal length is approximately equivalent to the inverse of the diopter value of the right eye of the user based on the right focal length of the right eye display being inequivalent to the inverse of the diopter value of the right eye of the user, or (3) the first eye distance of the display device until the first eye distance is approximately equivalent to the second eye distance of the user based on the first eye distance of the display device being inequivalent to the second eye distance of the user by adjusting a left adjustment knob in order to trigger a left movement or a right movement of a left bevel gear that adjusts the first eye distance or by adjusting a right adjustment knob in order to trigger a left movement or a right movement of a right bevel gear that adjusts the first eye distance.

2. The method of claim 1, wherein the left focal length of the left eye display is approximately equivalent to the inverse of the diopter value of the left eye of the user if the visual clarity of the left eye of the user is approximately in focus;
   wherein the right focal length of the right eye display is approximately equivalent to the inverse of the diopter value of the right eye of the user if the visual clarity of the right eye of the user is approximately in focus; and
   wherein the first eye distance of the display device is approximately equivalent to the second eye distance of the user if a pupil of the left eye of the user approximately matches the center of the left eye display and a pupil of the right eye of the user approximately matches the center of the right eye display.

3. The method of claim 1, wherein adjusting at least one of: (1) the left focal length of the left eye display, (2) the right focal length of the right eye display, or (3) the first eye distance of the display device comprises: adjusting at least one of: (1) the left focal length of the left eye display, (2) the right focal length of the right eye display, or (3) the first eye distance of the display device with at least one of: a left adjustment knob, a right adjustment knob, a left bevel gear, a right bevel gear, a set of support brackets, a set of e-rings, or a set of screws;
   wherein at least one of the set of support brackets, the set of screws, or the set of e-rings is configured to hold the left adjustment knob in place with respect to the left bevel gear, and wherein at least one of the set of support brackets, the set of screws, or the set of e-rings is configured to hold the right adjustment knob in place with respect to the right bevel gear.

4. The method of claim 3, wherein adjusting the left focal length of the left eye display comprises: adjusting the left adjustment knob in order to trigger a rotational movement of the left bevel gear that adjusts the left focal length of the left eye display;
   wherein adjusting the right focal length of the right eye display comprises: adjusting the right adjustment knob in order to trigger a rotational movement of the right bevel gear that adjusts the right focal length of the right eye display.

5. The method of claim 4, wherein adjusting the left adjustment knob in order to trigger the left movement of the left bevel gear comprises: moving the left adjustment knob in a left direction in order to trigger the left movement of the left bevel gear and expand a distance between the left bevel gear and the right bevel gear that increases the first eye distance of the display device; and
   wherein adjusting the right adjustment knob in order to trigger the right movement of the right bevel gear comprises: moving the right adjustment knob in a right direction in order to trigger the right movement of the right bevel gear and expand the distance between the left bevel gear and the right bevel gear that increases the first eye distance of the display device.

6. The method of claim 4, wherein adjusting the left adjustment knob in order to trigger the right movement of the left bevel gear comprises: moving the left adjustment knob in a right direction in order to trigger the right movement of the left bevel gear and decrease a distance between the left bevel gear and the right bevel gear that decreases the first eye distance of the display device; and wherein adjusting the right adjustment knob in order to trigger the left movement of the right bevel gear comprises: moving the right adjustment knob in a left direction in order to trigger the left movement of the right bevel gear and decrease the distance between the left bevel gear and the right bevel gear that decreases the first eye distance of the display device.

7. The method of claim 4, wherein adjusting the left adjustment knob in order to trigger the rotational movement of the left bevel gear comprises: rotating the left adjustment knob in a clockwise fashion in order to trigger a clockwise movement of the left bevel gear that increases the left focal length of the left eye display; and wherein adjusting the right adjustment knob in order to trigger the rotational movement of the right bevel gear comprises: rotating the right adjustment knob in a clockwise fashion in order to trigger a clockwise movement of the right bevel gear that increases the right focal length of the right eye display.

8. The method of claim 4, wherein adjusting the left adjustment knob in order to trigger the rotational movement of the left bevel gear comprises: rotating the left adjustment knob in a counterclockwise fashion in order to trigger a counterclockwise movement of the left bevel gear that decreases the left focal length of the left eye display; and wherein adjusting the right adjustment knob in order to trigger the rotational movement of the right bevel gear comprises: rotating the right adjustment knob in a counterclockwise fashion in order to trigger a counterclockwise movement of the right bevel gear that decreases the right focal length of the right eye display.

9. The method of claim 1, further comprising:

outputting an indication of the adjustment of at least one of: (1) the left focal length of the left eye display based on the left focal length of the left eye display being inequivalent to the inverse of the diopter value of the left eye of the user, (2) the right focal length of the right eye display based on the right focal length of the right eye display being inequivalent to the inverse of the diopter value of the right eye of the user, or (3) the first eye distance of the display device;

wherein the first eye distance of the display device is a length between the center of the left eye display and the center of the right eye display, wherein the second eye distance of the user is a length between a pupil of the left eye of the user and a pupil of the right eye of the user, wherein the first eye distance of the display device is a first interpupillary distance (IPD), and wherein the second eye distance of the user is a second IPD.

10. An apparatus for device adjustment, comprising:

at least one memory; and at least one processor coupled to the at least one memory and, based at least in part on information stored in the at least one memory, the at least one processor is configured to:

identify at least one of: (1) a left focal length of a left eye display of a display device, (2) a right focal length of a right eye display of the display device, or (3) a first eye distance of the display device, wherein the left focal length is a distance between a center of the left eye display and a focus of a lens in the left eye display, wherein the right focal length is a distance between a center of the right eye display and a focus of a lens in the right eye display, and wherein the first eye distance of the display device is a length between the left eye display and the right eye display;

detect whether at least one of: (1) the left focal length of the left eye display is equivalent to an inverse of a diopter value of a left eye of a user of the display device, (2) the right focal length of the right eye display is equivalent to an inverse of a diopter value of a right eye of the user, or (3) the first eye distance of the display device is equivalent to a second eye distance of the user, wherein the diopter value of the left eye of the user is associated with a visual clarity of the left eye of the user, wherein the diopter value of the right eye of the user is associated with a visual clarity of the right eye of the user, and wherein the second eye distance of the user is a length between the left eye of the user and the right eye of the user; and adjust at least one of: (1) the left focal length of the left eye display until the left focal length is approximately equivalent to the inverse of the diopter value of the left eye of the user based on the left focal length of the left eye display being inequivalent to the inverse of the diopter value of the left eye of the user, (2) the right focal length of the right eye display until the right focal length is approximately equivalent to the inverse of the diopter value of the right eye of the user based on the right focal length of the right eye display being inequivalent to the inverse of the diopter value of the right eye of the user, or (3) the first eye distance of the display device until the first eye distance is approximately equivalent to the second eye distance of the user based on the first eye distance of the display device being inequivalent to the second eye distance of the user by adjusting a left adjustment knob in order to trigger a left movement or a right movement of a left bevel gear that adjusts the first eye distance or by adjusting a right adjustment knob in order to trigger a left movement or a right movement of a right bevel gear that adjusts the first eye distance.

11. A device, comprising:

a left adjustment knob and a right adjustment knob; and a left bevel gear coupled to the left adjustment knob and a right bevel gear coupled to the right adjustment knob;

wherein the left bevel gear and the right bevel gear are configured to adjust at least one of (1) a left focal length of a left eye display of the device until the left focal length is approximately equivalent to an inverse of a diopter value of a left eye of a user of the device based on the left focal length being inequivalent to the inverse of the diopter value of the left eye of a user of the device, (2) a right focal length of a right eye display until the right focal length is approximately equivalent to the inverse of the diopter value of a right eye of the user based on the right focal length being inequivalent to the inverse of the diopter value of the right eye of the user, or (3) a first eye distance of the device until the first eye distance is approximately equivalent to a second eye distance of the user based on the first eye distance being inequivalent to the second eye distance of the user, wherein the first eye distance of the device is a length between the left eye display and the right eye display of the device, wherein the second eye distance of the user is a length between the left eye of the user and the right eye of the user, wherein the left focal length is a distance between a center of the left eye display and a focus of a lens in the left eye display, wherein the right focal length is a distance between a center of the right eye display and a focus of a lens in the right eye display, wherein the diopter value of the left eye of the user is associated with a visual clarity of the left eye of the user, wherein the diopter value of the right eye of the user is associated with a visual clarity of the right eye of the user, wherein an adjustment of the left adjustment knob is configured to trigger a left movement or a right movement of the left bevel gear that adjusts the first eye distance or an adjustment of the right adjustment knob is configured to trigger a left movement or a right movement of the right bevel gear that adjusts the first eye distance.

12. The device of claim 11, further comprising: at least one of a set of support brackets, a set of e-rings, or a set of screws coupled to at least one of the left adjustment knob or the right adjustment knob, wherein at least one of the set of support brackets, the set of screws, or the set of e-rings is configured to hold the left adjustment knob in place with respect to the left bevel gear, and wherein at least one of the set of support brackets, the set of screws, or the set of e-rings is configured to hold the right adjustment knob in place with respect to the right bevel gear.

13. The device of claim 11, wherein the left focal length of the left eye display is approximately equivalent to the inverse of the diopter value of the left eye of the user if the visual clarity of the left eye of the user is approximately in focus;

wherein the right focal length of the right eye display is approximately equivalent to the inverse of the diopter value of the right eye of the user if the visual clarity of the right eye of the user is approximately in focus; and wherein the first eye distance of the device is approximately equivalent to the second eye distance of the user if a pupil of the left eye of the user approximately matches the center of the left eye display and a pupil of the right eye of the user approximately matches the center of the right eye display.

14. The device of claim 12, wherein an adjustment of the left adjustment knob is configured to trigger a rotational movement of the left bevel gear that adjusts the left focal length of the left eye display;

wherein an adjustment of the right adjustment knob is configured to trigger a rotational movement of the right bevel gear that adjusts the right focal length of the right eye display.

15. The device of claim 14, wherein the adjustment of the left adjustment knob in order to trigger the left movement of the left bevel gear comprises: a movement of the left adjustment knob in a left direction in order trigger the left movement of the left bevel gear and expand a distance between the left bevel gear and the right bevel gear that increases the first eye distance of the device; and wherein the adjustment of the right adjustment knob in order to trigger the right movement of the right bevel gear comprises: a movement of the right adjustment knob in a right direction in order trigger the right movement of the right bevel gear and expand the distance between the left bevel gear and the right bevel gear that increases the first eye distance of the device.

16. The device of claim 14, wherein the adjustment of the left adjustment knob in order to trigger the right movement of the left bevel gear comprises: a movement of the left adjustment knob in a right direction in order to trigger the right movement of the left bevel gear and decrease a distance between the left bevel gear and the right bevel gear that decreases the first eye distance of the device; and wherein the adjustment of the right adjustment knob in order to trigger the left movement of the right bevel gear comprises: a movement of the right adjustment knob in a left direction in order to trigger the left movement of the right bevel gear and decrease the distance between the left bevel gear and the right bevel gear that decreases the first eye distance of the device.

17. The device of claim 14, wherein the adjustment of the left adjustment knob in order to trigger the rotational movement of the left bevel gear comprises: a rotation of the left adjustment knob in a clockwise fashion in order to trigger a clockwise movement of the left bevel gear that increases the left focal length of the left eye display; and wherein the adjustment of the right adjustment knob in order to trigger the rotational movement of the right bevel gear comprises: a rotation of the right adjustment knob in a clockwise fashion in order to trigger a clockwise movement of the right bevel gear that increases the right focal length of the right eye display.

18. The device of claim 14, wherein the adjustment of the left adjustment knob in order to trigger the rotational movement of the left bevel gear comprises: a rotation of the left adjustment knob in a counterclockwise fashion in order to trigger a counterclockwise movement of the left bevel gear that decreases the left focal length of the left eye display; and wherein the adjustment of the right adjustment knob in order to trigger the rotational movement of the right bevel gear comprises: a rotation of the right adjustment knob in a counterclockwise fashion in order to trigger a counterclockwise movement of the right bevel gear that decreases the right focal length of the right eye display.

* * * * *